United States Patent
Souders et al.

(10) Patent No.: US 8,176,224 B2
(45) Date of Patent: *May 8, 2012

(54) APPARATUS FOR NON-DISRUPTIVELY DISCONNECTING A PERIPHERAL DEVICE

(75) Inventors: Keith A. Souders, Tampa, FL (US); Jamal Haque, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 16 days.

This patent is subject to a terminal disclaimer.

(21) Appl. No.: 12/778,173

(22) Filed: May 12, 2010

(65) Prior Publication Data

US 2010/0223408 A1    Sep. 2, 2010

Related U.S. Application Data

(63) Continuation of application No. 11/935,127, filed on Nov. 5, 2007, now Pat. No. 8,041,859.

(51) Int. Cl.
*G06F 13/14* (2006.01)

(52) U.S. Cl. ......... 710/62; 710/1; 710/2; 710/8; 710/63; 710/64; 710/72; 710/73; 710/74; 710/100; 710/305; 370/216; 370/254; 370/362; 370/400

(58) Field of Classification Search .............. 710/62–64, 710/72–74, 100, 305
See application file for complete search history.

(56) References Cited

U.S. PATENT DOCUMENTS

| | | | |
|---|---|---|---|
| 4,709,365 A | 11/1987 | Beale | |
| 5,586,271 A | 12/1996 | Parrett | |
| 5,768,541 A | 6/1998 | Pan-Ratzlaff | |
| 6,134,662 A | 10/2000 | Levy et al. | |
| 6,202,103 B1 | 3/2001 | Vonbank et al. | |
| 6,212,633 B1 | 4/2001 | Levy et al. | |
| 6,275,886 B1 | 8/2001 | Levy | |
| 6,378,000 B1 | 4/2002 | Akatsu et al. | |
| 6,457,152 B1 | 9/2002 | Paley et al. | |
| 6,496,862 B1 | 12/2002 | Akatsu et al. | |
| 6,505,255 B1 | 1/2003 | Akatsu et al. | |
| 6,519,567 B1 | 2/2003 | Fujii | |
| 6,519,657 B1 | 2/2003 | Stone et al. | |
| 6,523,064 B1 | 2/2003 | Akatsu et al. | |
| 6,538,758 B1 | 3/2003 | Ikegawa | |
| 6,539,484 B1 | 3/2003 | Cruz | |
| 6,598,111 B1 | 7/2003 | Henehan | |
| 6,611,155 B2 | 8/2003 | Sterrantino | |
| 6,633,547 B1 | 10/2003 | Akatsu et al. | |
| 6,718,476 B1 | 4/2004 | Shima | |
| 6,738,843 B2 | 5/2004 | Bennett | |
| 6,754,692 B2 | 6/2004 | Cruz | |
| 6,763,402 B2 | 7/2004 | Talati | |
| 6,813,651 B1 | 11/2004 | Smith et al. | |

(Continued)

FOREIGN PATENT DOCUMENTS

JP    2005236400    9/2005

*Primary Examiner* — Tammara Peyton
(74) *Attorney, Agent, or Firm* — Fogg & Powers LLC

(57) ABSTRACT

An electronic device includes a communication bus having a physical layer for interacting with a peripheral device. The physical layer is configured to be adjacent to a link layer on the peripheral device. The electronic device further includes a connector at a junction of the physical layer and the link layer. Communication through the communication bus is maintained through the physical layer when the link layer of the peripheral device is disconnected from the physical layer at the connector.

10 Claims, 13 Drawing Sheets

U.S. PATENT DOCUMENTS

| | | |
|---|---|---|
| 6,816,993 B1 | 11/2004 | Furuyama |
| 6,822,946 B1 | 11/2004 | Wallace |
| 6,902,433 B1 * | 6/2005 | Hashimoto et al. ...... 439/620.15 |
| 6,961,099 B2 | 11/2005 | Takano et al. |
| 6,963,590 B1 | 11/2005 | Mann et al. |
| 6,985,780 B2 | 1/2006 | Hudson et al. |
| 6,988,008 B2 | 1/2006 | Hudson et al. |
| 7,020,076 B1 | 3/2006 | Alkalai et al. |
| 7,058,825 B2 | 6/2006 | Kobayashi |
| 7,062,332 B2 | 6/2006 | Matsuda |
| 7,143,172 B2 | 11/2006 | Isoda |
| 7,165,121 B2 | 1/2007 | Richman |
| 7,174,224 B2 | 2/2007 | Hudson et al. |
| 7,180,908 B2 | 2/2007 | Valavi et al. |
| 7,187,655 B1 | 3/2007 | Sato et al. |
| 7,197,100 B2 | 3/2007 | Bunton et al. |
| 7,228,442 B2 | 6/2007 | Kinstler |
| 7,355,965 B2 | 4/2008 | Griswold et al. |
| 2002/0061025 A1 | 5/2002 | Masunaga et al. |
| 2002/0152341 A1 | 10/2002 | Bennett |
| 2003/0039243 A1 | 2/2003 | Parker |
| 2003/0107987 A1 | 6/2003 | Kinstler |
| 2003/0145143 A1 | 7/2003 | Adelman |
| 2004/0015637 A1 | 1/2004 | Yau |
| 2004/0024918 A1 | 2/2004 | Skidmore et al. |
| 2004/0034720 A1 | 2/2004 | Fujita et al. |
| 2005/0020148 A1 | 1/2005 | Peng et al. |
| 2005/0053381 A1 | 3/2005 | Wood |
| 2005/0163167 A1 | 7/2005 | Kim |
| 2005/0179822 A1 | 8/2005 | Takano et al. |
| 2005/0220122 A1 | 10/2005 | Kinstler |
| 2005/0223260 A1 | 10/2005 | Kinstler |
| 2005/0276607 A1 | 12/2005 | Schunk |
| 2006/0002314 A1 | 1/2006 | Fukunaga et al. |
| 2006/0007853 A1 | 1/2006 | Kim |
| 2006/0047787 A1 | 3/2006 | Agarwal et al. |
| 2006/0050731 A1 | 3/2006 | Thomas |
| 2006/0082652 A1 * | 4/2006 | Sugiyama ................. 348/207.1 |
| 2006/0092977 A1 | 5/2006 | Bai et al. |
| 2006/0095597 A1 | 5/2006 | Bai et al. |
| 2006/0285547 A1 | 12/2006 | Takeuchi |
| 2007/0073824 A1 | 3/2007 | Choo et al. |
| 2008/0016269 A1 | 1/2008 | Chow |
| 2008/0140867 A1 | 6/2008 | Souders et al. |
| 2009/0119421 A1 | 5/2009 | Souders et al. |
| 2009/0122725 A1 | 5/2009 | Souders et al. |

* cited by examiner

APPARATUS FOR NON-DISRUPTIVELY DISCONNECTING A PERIPHERAL DEVICE

CROSS-REFERENCE TO RELATED APPLICATIONS

The present application is a continuation of, and claims priority to, U.S. patent application Ser. No. 11/935,127 (hereafter "the '127 Application"), entitled "APPARATUS AND METHOD FOR CONNECTIVITY IN NETWORKS CAPABLE OF NON-DISRUPTIVELY DISCONNECTING PERIPHERAL DEVICES," filed on Nov. 5, 2007, which, in turn, is related to commonly assigned and co-pending U.S. patent application Ser. No. 11/608,905 (hereafter "the '905 Application") entitled "APPARATUS FOR NON-DISRUPTIVELY DISCONNECTING A PERIPHERAL DEVICE", filed on Dec. 11, 2006. Both the '127 Application and the '905 Application are incorporated herein by reference in their entirety.

BACKGROUND OF THE INVENTION

Plug and play (PnP) systems are used in virtually all personal computers and numerous computer-controlled machines as well. PnP systems, which are also known as hot-swapping systems, allow connections and disconnections of peripheral devices to a host system without manual installation of device drivers or a reboot of the host system.

A principle feature of a PnP system is its ability to automatically reconfigure a communication bus after the connection or disconnection of a peripheral device ("peripheral"). When a communication bus of the PnP system observes a change in the peripheral layout, the bus initiates a reset. A connect or disconnect of a peripheral is recognized by sensing the power to the peripheral or by a special circuit on the peripheral's connector. The reconfiguration process recognizes and reacquires all of the peripherals connected to the bus to ensure that each peripheral is properly loaded in the host system and is given access to the communication bus. The reconfiguration process must reconfigure all of the peripherals connected to the bus even if only one peripheral is connected or disconnected, in order to ensure that no peripherals are in conflict. The reconfiguration process recognizes any newly connected peripheral, and automatically retrieves and loads the drivers for that peripheral. Conversely, if a peripheral is disconnected, the reconfiguration process disables the peripheral's drivers within the system, and assigns that peripheral's time slot to another device. Some examples of commonly known PnP systems include Universal Serial Bus (USB), FireWire (IEEE 1394 protocol), and Peripheral Component Interconnect (PCI).

Existing communication buses typically include interfaces that allow devices to interact with the communication bus by converting the devices' complex commands and data into bit level data that can be transmitted over the bus. Many such interfaces are operated in accordance with protocols that are divided into layers. The layered design divides the functions of the protocol involved into a series of logical layers. Each layer requests services from the layer below and performs services for the layer above. Layering a protocol makes it easier to design and use. For example, the IEEE 1394 protocol is divided into a physical layer, a link layer, and a transaction layer.

The highest layer of the IEEE 1394 protocol is the transaction layer, which is responsible for reading, writing, and conveying other high level commands to and from each communicating device. The middle layer is the link layer, which handles data at a packet level. The lowest layer is the physical layer, which is responsible for actually transmitting and receiving data over the bus (including arbitration with the bus). Beyond the physical layer, the data is conveyed on the bus and is handled by another device. Consequently, the physical layer may be viewed as a junction between a peripheral and the other devices. Thus, the hardware connectors of a peripheral are located at the junction of the physical layer and the communication bus.

In existing PnP systems, such as for example, the PnP systems used in spacecraft, the communication bus is often configured so that the peripherals are daisy-chained together. This technique places each peripheral one behind the other along a communication stream. Consequently, a message that is transmitted to one peripheral must be passed on by, or allowed to be passed through, that peripheral to the next peripheral in the chain. For example, in order for a message to be passed from a host to the fifth peripheral in a chain, the first four peripherals in the chain must forward the message before it can arrive at the fifth peripheral. Consequently, since any peripheral in the chain depends upon the viability of the peripherals upstream, if one peripheral is incapable of forwarding data, then all of the peripherals downstream from that peripheral will lose communication with the host. Thus, a significant problem with the existing systems is that if a peripheral is disconnected from the communication bus, the bus has to be reconfigured in order to remove the disconnected peripheral from the chain.

SUMMARY OF THE INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. In one embodiment, an electronic device includes a communication bus having a physical layer for interacting with a peripheral device. The physical layer is configured to be adjacent to a link layer on the peripheral device. The electronic device further includes a connector at a junction of the physical layer and the link layer. Communication through the communication bus is maintained through the physical layer when the link layer of the peripheral device is disconnected from the physical layer at the connector.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

In accordance with common practice, the various described features are not drawn to scale but are drawn to emphasize specific features relevant to the present invention. Reference characters denote like elements throughout Figures and text.

DETAILED DESCRIPTION OF PREFERRED EMBODIMENT

A novel method and apparatus is disclosed that solves the above-described problem, by allowing disconnection of a peripheral from a communication bus without causing disruption to other peripherals on the bus. This non-disruptive disconnection is accomplished by physically disconnecting the peripheral from the communication bus without causing a reconfiguration of the bus. More precisely, the non-disruptive disconnection is accomplished by placing the physical connector for the peripheral between the interfaces for the physical layer and link layer of the protocol involved. Before a peripheral is disconnected, the link layer is disabled. However, the physical layer remains enabled while the peripheral is being disconnected, because the arrangement of the peripheral's connector at the interface between the physical layer and the link layer enables the peripheral to be removed without removing the physical layer. Thus, based on the novel techniques disclosed in this application, the communication bus does not have to be reconfigured after a peripheral is disconnected, because the bus can still communicate with all of the same physical layers it communicated with before the peripheral was disconnected.

There is also no technique that exists in the prior art that can provide suitable connectivity for those networks that are configured to implement the techniques disclosed in this application. For example, with the implementation of new high speed interfaces such as those included in the IEEE 1394 or 1394(a)(b) protocols targeted for space and military applications, such requirements as performance, power, weight and size have to justify the choice. Considering the example of the IEEE 1394 protocol, existing network configuration topologies can provide reduced power, weight and size but with continued susceptibility to broken links, or they can provide robust connectivity for broken links at the expense of reduced power, weight and size. Thus, in order to take full advantage of the novel configurations disclosed in this application, suitable network connectivity (e.g., cabling, etc.) has to be provided. In other words, there are no suitable active cables or cable assemblies for networks that can be implemented using the separated physical layer and link layer interfaces disclosed in this application. Consequently, the existing networks are unable to capitalize on all of the potential advantages and benefits of the novel techniques disclosed in this application.

Figure 1:
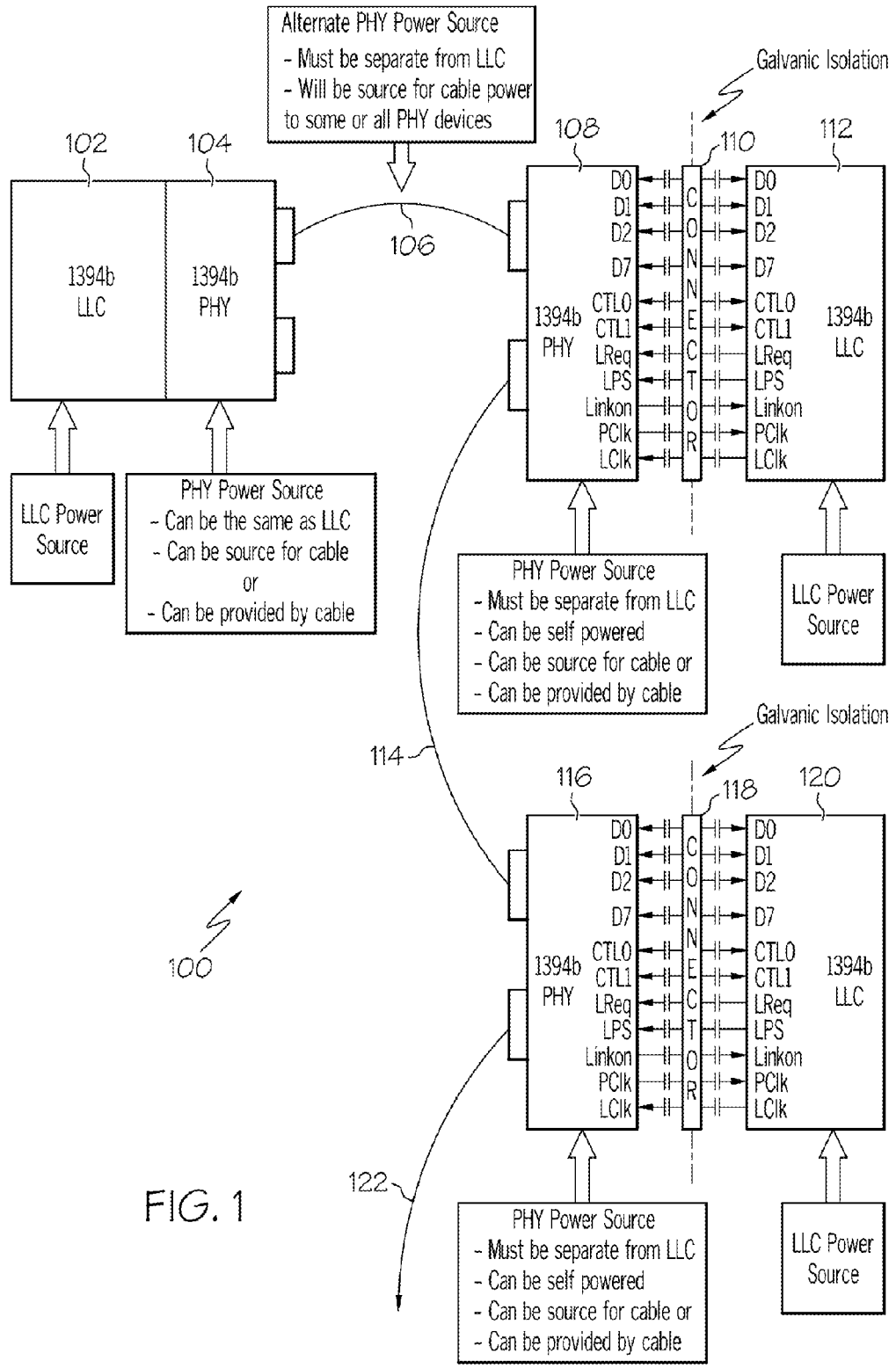
FIG. 1 depicts a block diagram of an example IEEE 1394b network, which is arranged in a semi-robust configuration including separated physical layer and link layer interfaces.

FIG. 1 depicts a block diagram of an example IEEE 1394b network 100, which is arranged in a semi-robust configuration including separated physical layer and link layer interfaces as disclosed in this Application. Note that in this illustrative example, no peripheral devices are shown. As such, network 100 includes a first link layer segment 102, a first physical layer segment 104, and a standard connection between these two logical segments. Also included is a second physical layer segment 108, a second link layer segment 112, and a robust connector 110 (e.g., separated at the physical layer and link layer interfaces) between these two logical segments. Network 100 also includes a third physical layer segment 116, a third link layer segment 120, and a robust connector 118 (e.g., separated at the physical layer and link layer interfaces) between these two logical segments. However, note that in the example network configuration shown in FIG. 1, three physical interconnecting cables 106, 114 and 122 are being used. Notably, the number of different physical connections in the existing network configurations is proportional to the number of physical interconnecting cables being used. As illustrated by the configuration shown in FIG. 1, the existing networks require physical layer to physical layer cabling in addition to physical layer to link layer connectivity. Consequently, the conventional cables or cable assemblies being used in the existing robust and semi-robust applications are not designed to minimize the number of physical connections used. Therefore, a pressing need exists for new techniques that can provide suitable connectivity (e.g., active cabling and/or cabling assemblies that can minimize the number of physical connections required) in those networks capable of non-disruptively disconnecting peripheral devices, such as for example, networks capable of implementing the non-disruptive disconnection techniques disclosed in the this application. Also, a need exists for new techniques that can provide suitable connectivity for the physical layer in the new robust applications, because the physical layer will no longer reside in the remote devices but rather as part of the physical connectivity or cabling in the robust designs.

Essentially, the present invention provides suitable connectivity (e.g., active cabling and/or cabling assemblies) in networks capable of non-disruptively disconnecting peripheral devices, such as for example, networks capable of implementing the non-disruptive disconnection techniques disclosed in this application. By configuring a network with peripheral devices including interfaces that are separated at the physical layer and link layer boundaries, the physical layer's repeater functionality can remain intact when the peripheral device is disconnected, has failed, or has been shut down. Thus, the robustness of the network remains intact and unchanged, and the result is a network with a relatively low cost, low power, small size and robust technology. For one or more example embodiments, the present invention provides active cables, active cable assemblies, and/or active connectors (e.g., including connectivity for the physical layer's power source), which encapsulate the physical layer components of the networks involved and minimize the number of physical connections required.

Figure 2A:
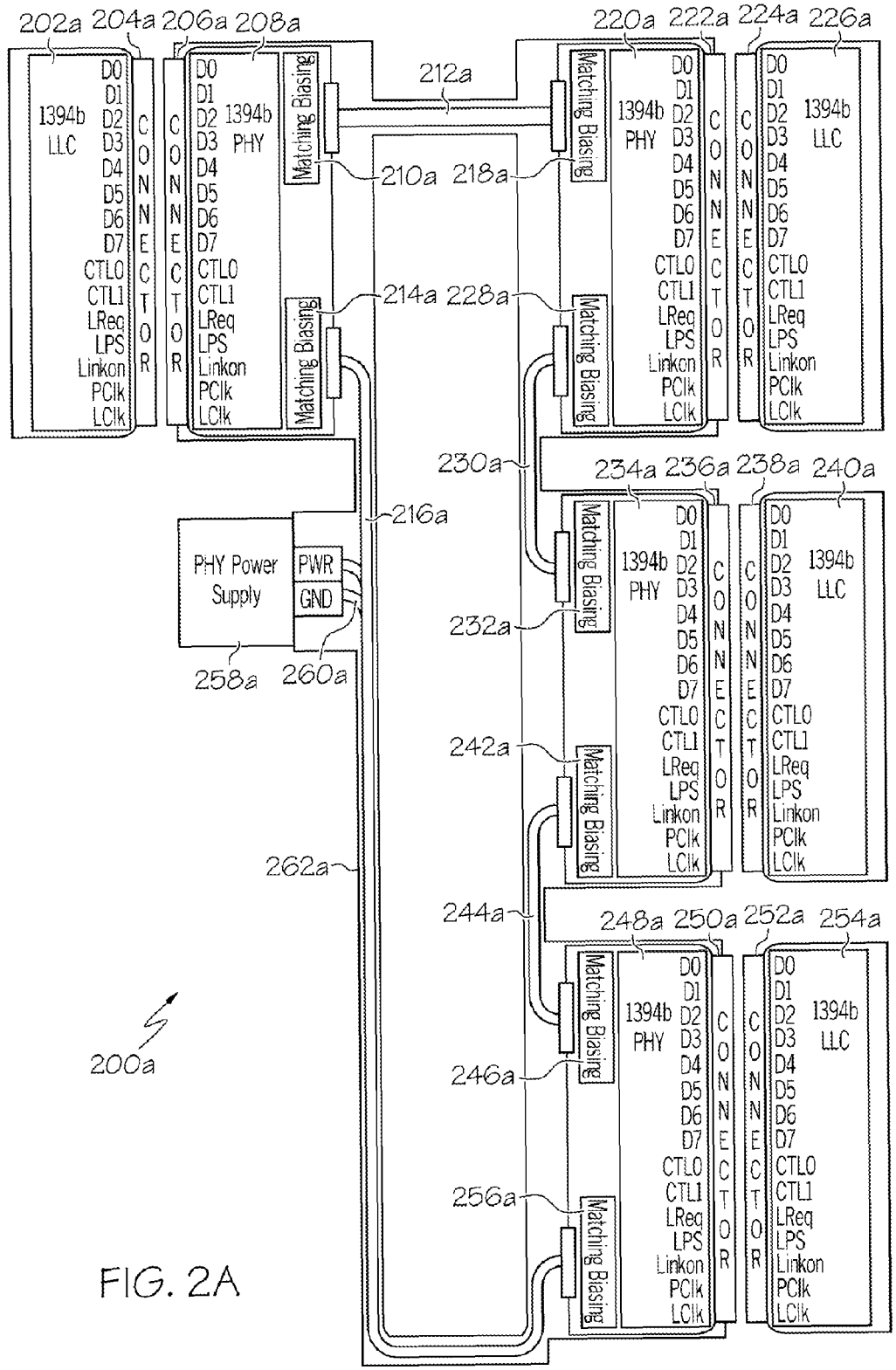
FIGS. 2A and 2B are related block diagrams depicting two active connector assemblies, which can be used to implement one or more example embodiments of the present invention.
Figure 2B:
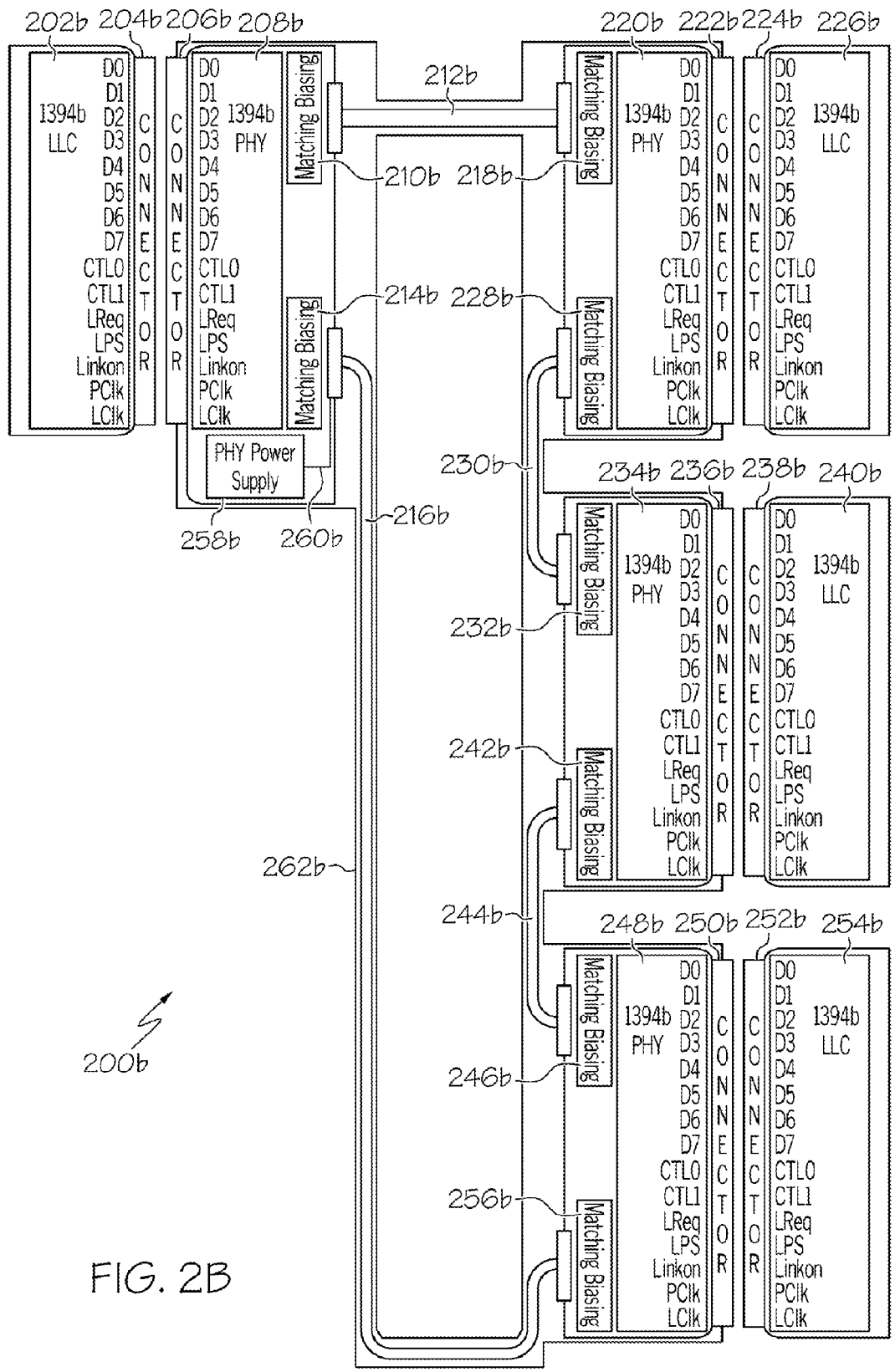

With reference again to the figures, FIGS. 2A and 2B are related block diagrams depicting two active connector assemblies 200a and 200b, which can be used to implement one or more example embodiments of the present invention. For illustrative purposes in the example embodiments shown, the two connector assemblies 200a and 200b may represent similar connector assemblies that can be used, for example, in networks being operated in accordance with the IEEE 1394b protocol.

Note that, for the example embodiments depicted in FIGS. 2A and 2B, only two-node physical layer interfaces are shown. In other words, each physical layer segment shown in this illustrative example includes two matching and biasing networks and two cable connections. However, the present invention is not intended to be so limited and can include any suitable number of nodes for the physical layer interfaces involved. For example, the present invention might include physical layer segments with three matching and biasing networks and three cable connections each. If more than three nodes per physical layer segment are to be used, the last device in the chain could require only a single node. If that device were to be disconnected robustly, that function could be accomplished with a single node, robust interface.

Also note that, for the example embodiments depicted in FIGS. 2A and 2B, only four devices (one pseudo-master device and three remote devices) are shown. However, the present invention is not intended to be so limited and can include any suitable number of devices for the network configuration involved. Albeit, as a practical matter, the maximum number of devices is typically dictated by the bus specifications involved. For example, in accordance with the IEEE 1394 bus specifications, a maximum of 63 devices can be connected to one bus. In any event, a typical network configuration can include a substantial number of devices, and the present invention can be implemented using some or all of the devices involved.

Note further that, for the example embodiments depicted in FIGS. 2A and 2B, only one physical layer power source is shown. However, the present invention is not intended to be so limited and can include any suitable number of physical layer power sources for the network configuration involved. For example, depending on the number of devices on the bus involved, more than one physical layer power source may be provided. The one or more physical layer power source(s) provided can be internal to the physical layer, external to the physical layer, or one or more combinations thereof. Proper implementation can be assured by suitable routing and connection of the cabling involved.

Essentially, for the example embodiments shown in FIGS. 2A and 2B, the present invention provides respective active connector assemblies that encapsulate the IEEE 1394b physical layer segments, cable matching and biasing resistor networks, cabling and cable connectors, and the connectors that provide the physical layer to link layer interfaces. For example, the exemplary connector assemblies 200a, 200b shown can be produced using manufacturing techniques similar to those used to create Multi-Chip Modules (MCM), which can be used to build very small connector assemblies that can be plugged into link layers on one end and IEEE 1394b cables on the other end. As an option, the cable assemblies can be permanently attached in order to reduce the size, weight and cost of the cable connectors, or the physical layer connector assembly can be manufactured to accommodate standard cable connections. Also, the physical layer connector assemblies will provide power connectivity, so as optional alternatives, for example, the physical layer's power source can be: (1) created internally to the connector and used exclusively in the connector; (2) created internally to the connector and used in the connector as a power source for some or all of the other physical layer connectors in the network; (3) powered from the cable and sourced from another physical layer or an external supply; and/or (4) supplied externally and independently from all of the physical layers to provide a power source for some or all of the physical layer devices involved. In sum, the present invention provides active cables, active cable assemblies and/or active connectors that can accommodate the novel technique of non-disruptively disconnecting peripheral devices in networks including robust physical layer/link layer connections, as well as hybrid networks including both standard and robust connections.

For some embodiments, the present invention may be used to implement active connector assemblies for other types of networks or applications, such as for example, Ethernet networks, USB interfaces, and the like. Essentially, the present invention may be used in any type of network or application where the power source for the physical layer can be separated from the physical layer segments and link layer segments involved.

Specifically, the exemplary connector assembly 200a shown in FIG. 2A includes a first link layer segment 202a, a connector 204a for the first link layer segment 202a, a first physical layer segment 208a, and a connector 206a for the first physical layer segment 208a. The connectors 204a, 206a are matched connectors that can be plugged into one another. The first physical layer segment 208a includes a first matching and biasing network 210a and a second matching and biasing network 214a. As shown, for one or more example embodiments, the first link layer segment 202a, first physical layer segment 208a, and matching connectors 204a, 206a compose a robust connection for an IEEE 1394b network configuration, and the robust connection can be used to non-disruptively disconnect a peripheral device from the IEEE 1394b network involved.

For one or more example embodiments, connector assembly 200a also includes a second physical layer segment 220a, a connector 222a for the second physical layer segment 220a, a second link layer segment 226a, and a connector 224a for the second link layer segment 226a. The connectors 222a, 224a are matched connectors that can be plugged into one another. The second physical layer segment 220a includes a first matching and biasing network 218a and a second matching and biasing network 228a. An active cable segment 212a is connected to the matching and biasing network 210a of physical layer segment 208a on one end, and to the matching and biasing network 218a of physical layer segment 220a on the second end. As shown, for one or more example embodiments, the second physical layer segment 220a, second link layer segment 226a, and matching connectors 222a, 224a compose a robust connection for an IEEE 1394b network configuration, and the robust connection can be used to non-disruptively disconnect a peripheral device from the 1394b network involved. Also, in accordance with the present invention, the active cable segment 212a provides non-disruptive signal and power connectivity between the two physical layer segments 208a, 220a.

For one or more example embodiments, the exemplary connector assembly 200a also includes a third physical layer segment 234a, a connector 236a for the third physical layer segment 234a, a third link layer segment 240a, and a connector 238a for the third link layer segment 240a. The connectors 236a, 238a are matched connectors that can be plugged into one another. The third physical layer segment 234a includes a first matching and biasing network 232a and a second matching and biasing network 242a. An active cable segment 230a is connected to the matching and biasing network 228a of the second physical layer segment 220a on one end, and to the matching and biasing network 232a of the third physical layer segment 234a on the second end. As shown, for one or more example embodiments, the third physical layer segment 234a, third link layer segment 240a, and matching connectors 236a, 238a compose a robust connection for an IEEE 1394b network configuration, and the robust connection can be used to non-disruptively disconnect a peripheral device from the IEEE 1394b network involved. Also, in accordance with the present invention, the active cable segment 230a provides non-disruptive signal and power connectivity between the two physical layer segments 220a, 234a.

For one or more example embodiments, the exemplary connector assembly 200a also includes a fourth physical layer segment 248a, a connector 250a for the fourth physical layer segment 248a, a fourth link layer segment 254a, and a connector 252a for the fourth link layer segment 254a. The connectors 250a, 252a are matched connectors that can be plugged into one another. The fourth physical layer segment 248a includes a first matching and biasing network 246a and a second matching and biasing network 256a. An active cable segment 244a is connected to the matching and biasing network 242a of the third physical layer segment 234a on one end, and to the matching and biasing network 246a of the fourth physical layer segment 248a on the second end. As shown, for one or more example embodiments, the fourth physical layer segment 248a, fourth link layer segment 254a, and matching connectors 250a, 252a compose a robust connection for an IEEE 1394b network configuration, and the robust connection can be used to non-disruptively disconnect a peripheral device from the IEEE 1394b network involved. Also, in accordance with the present invention, the active cable segment 244a provides non-disruptive signal and power connectivity between the two physical layer segments 234a, 248a.

For one or more example embodiments, the exemplary connector assembly 200a also includes an active cable segment 216a connected to the matching and biasing network 256a of the fourth physical layer segment 248a on one end, and to the matching and biasing network 214a of the first physical layer segment 208a on the second end. Thus, in accordance with the present invention, the active cable segment 216a provides non-disruptive signal and power connectivity between the two physical layer segments 208a, 248a. Also, the exemplary connector assembly 200a includes an external physical layer power source 258a, which is coupled to the active cable segment 216a by a power source connection 260a. Consequently, in accordance with the present invention, the active cables 212a, 230a, 244a and 216a provide signal and power source connectivity to each of the physical layer segments 208a, 220a, 234a and 248a in the IEEE 1394b network involved. Notably, for the one or more example embodiments that can be implemented using the connector assembly 200a, the connector assembly can be encapsulated to provide a fixed cable construction using a suitable encapsulation material such as, for example, a plastic, ceramic, or metallic material. In other embodiments, the connector assembly 200a can be formed as one unit in a flexible or semi-stiff construction. In any event, the encapsulation of the exemplary connector assembly 200a is identified generally by the label 262a.

Referring now to FIG. 2B for one or more example embodiments, the exemplary connector assembly 200b can be similar in construction and functionality as connector assembly 200a shown in FIG. 2A. Note, however, that a primary difference between connector assembly 200a and connector assembly 200b is that connector assembly 200a provides an external power source for the physical layer segments, and connector assembly 200b provides an internal power source for the physical layer segments.

Specifically, for one or more example embodiments, the connector assembly 200b shown in FIG. 2B includes a first link layer segment 202b, a connector 204b for the first link layer segment 202b, a first physical layer segment 208b, and a connector 206b for the first physical layer segment 208b. The connectors 204b, 206b are matched connectors that can be plugged into one another. The first physical layer segment 208b includes a first matching and biasing network 210b and a second matching and biasing network 214b. As shown, for one or more example embodiments, the first link layer segment 202b, first physical layer segment 208b, and matching connectors 204b, 206b compose a robust connection for an IEEE 1394b network configuration, and the robust connection can be used to non-disruptively disconnect a peripheral device from the IEEE 1394b network involved.

For one or more example embodiments, the exemplary connector assembly 200b also includes a second physical layer segment 220b, a connector 222b for the second physical layer segment 220b, a second link layer segment 226b, and a connector 224b for the second link layer segment 226b. The connectors 222b, 224b are matched connectors that can be plugged into one another. The second physical layer segment 220b includes a first matching and biasing network 218b and a second matching and biasing network 228b. An active cable segment 212b is connected to the matching and biasing network 210b of physical layer segment 208b on one end, and to the matching and biasing network 218b of physical layer segment 220b on the second end. As shown, for one or more example embodiments, the second physical layer segment 220b, second link layer segment 226b, and matching connectors 222b, 224b compose a robust connection for an IEEE 1394b network configuration, and the robust connection can be used to non-disruptively disconnect a peripheral device from the 1394b network involved. Also, in accordance with the present invention, the active cable segment 212b provides non-disruptive signal and power connectivity between the two physical layer segments 208b, 220b.

For one or more example embodiments, the exemplary connector assembly 200b also includes a third physical layer segment 234b, a connector 236b for the third physical layer segment 234b, a third link layer segment 240b, and a connector 238b for the third link layer segment 240b. The connectors 236b, 238b are matched connectors that can be plugged into one another. The third physical layer segment 234b includes a first matching and biasing network 232b and a second matching and biasing network 242b. An active cable segment 230b is connected to the matching and biasing network 228b of the second physical layer segment 220b on one end, and to the matching and biasing network 232b of the third physical layer segment 234b on the second end. As shown, for one or more example embodiments, the third physical layer segment 234b, third link layer segment 240b, and matching connectors 236b, 238b compose a robust connection for an IEEE 1394b network configuration, and the robust connection can be used to non-disruptively disconnect a peripheral device from the IEEE 1394b network involved. Also, in accordance with the present invention, the active cable segment 230b provides non-disruptive signal and power connectivity between the two physical layer segments 220b, 234b.

For one or more example embodiments, the exemplary connector assembly 200b also includes a fourth physical layer segment 248b, a connector 250b for the fourth physical layer segment 248b, a fourth link layer segment 254b, and a connector 252b for the fourth link layer segment 254b. The connectors 250b, 252b are matched connectors that can be plugged into one another. The fourth physical layer segment 248b includes a first matching and biasing network 246b and a second matching and biasing network 256b. An active cable segment 244b is connected to the matching and biasing network 242*b* of the third physical layer segment 234*b* on one end, and to the matching and biasing network 246*b* of the fourth physical layer segment 248*b* on the second end. As shown, for one or more example embodiments, the fourth physical layer segment 248*b*, fourth link layer segment 254*b*, and matching connectors 250*b*, 252*b* compose a robust connection for an IEEE 1394b network configuration, and the robust connection can be used to non-disruptively disconnect a peripheral device from the IEEE 1394b network involved. Also, in accordance with the present invention, the active cable segment 244*b* provides non-disruptive signal and power connectivity between the two physical layer segments 234*b*, 248*b*.

For one or more example embodiments, the exemplary connector assembly 200*b* also includes an active cable segment 216*b* connected to the matching and biasing network 256*b* of the fourth physical layer segment 248*b* on one end, and to the matching and biasing network 214*b* of the first physical layer segment 208*b* on the second end. Thus, in accordance with the present invention, the active cable segment 216*b* provides non-disruptive signal and power connectivity between the two physical layer segments 208*b*, 248*b*. Note that the exemplary connector assembly 200*b* also includes an internal physical layer power source 258*b*, which is coupled to the active cable segment 216*b* by a power source connection 260*b*. Consequently, in accordance with the present invention, the active cables 212*b*, 230*b*, 244*b* and 216*b* provide signal and power source connectivity to each of the physical layer segments 208*b*, 220*b*, 234*b* and 248*b* in the IEEE 1394b network involved. Notably, for the one or more example embodiments that can be implemented using the connector assembly 200*b*, the connector assembly can be encapsulated to provide a fixed cable construction using a suitable encapsulation material such as, for example, a plastic, ceramic, or metallic material. In other embodiments, the connector assembly 200*b* can be formed as one unit in a flexible or semi-stiff construction. In any event, the encapsulation of the exemplary connector assembly 200*b* is identified generally by the label 262*b*.

Figure 3A:
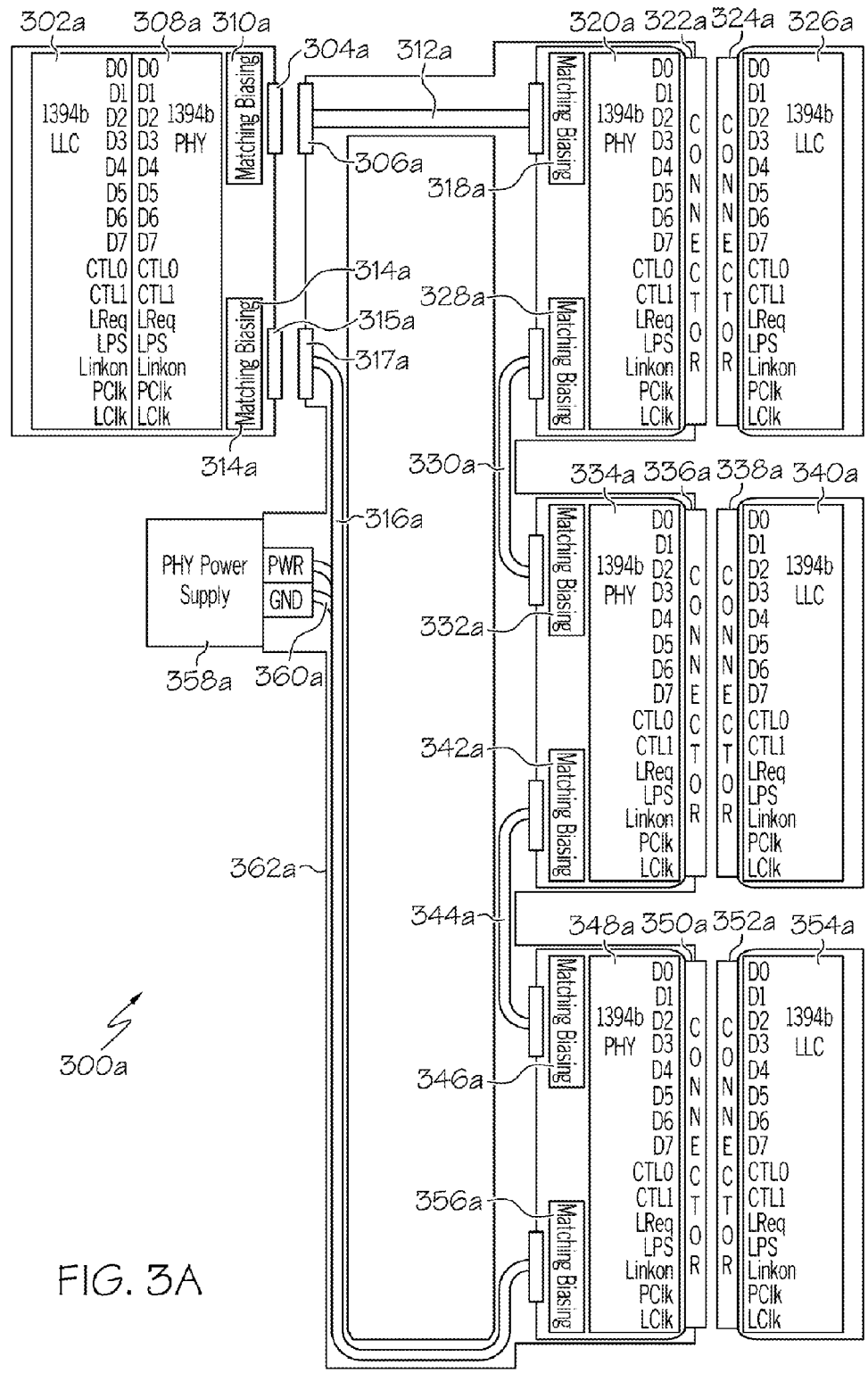
FIGS. 3A and 3B are related block diagrams depicting two active connector assemblies, which can be used to implement one or more example embodiments of the present invention.
Figure 3B:
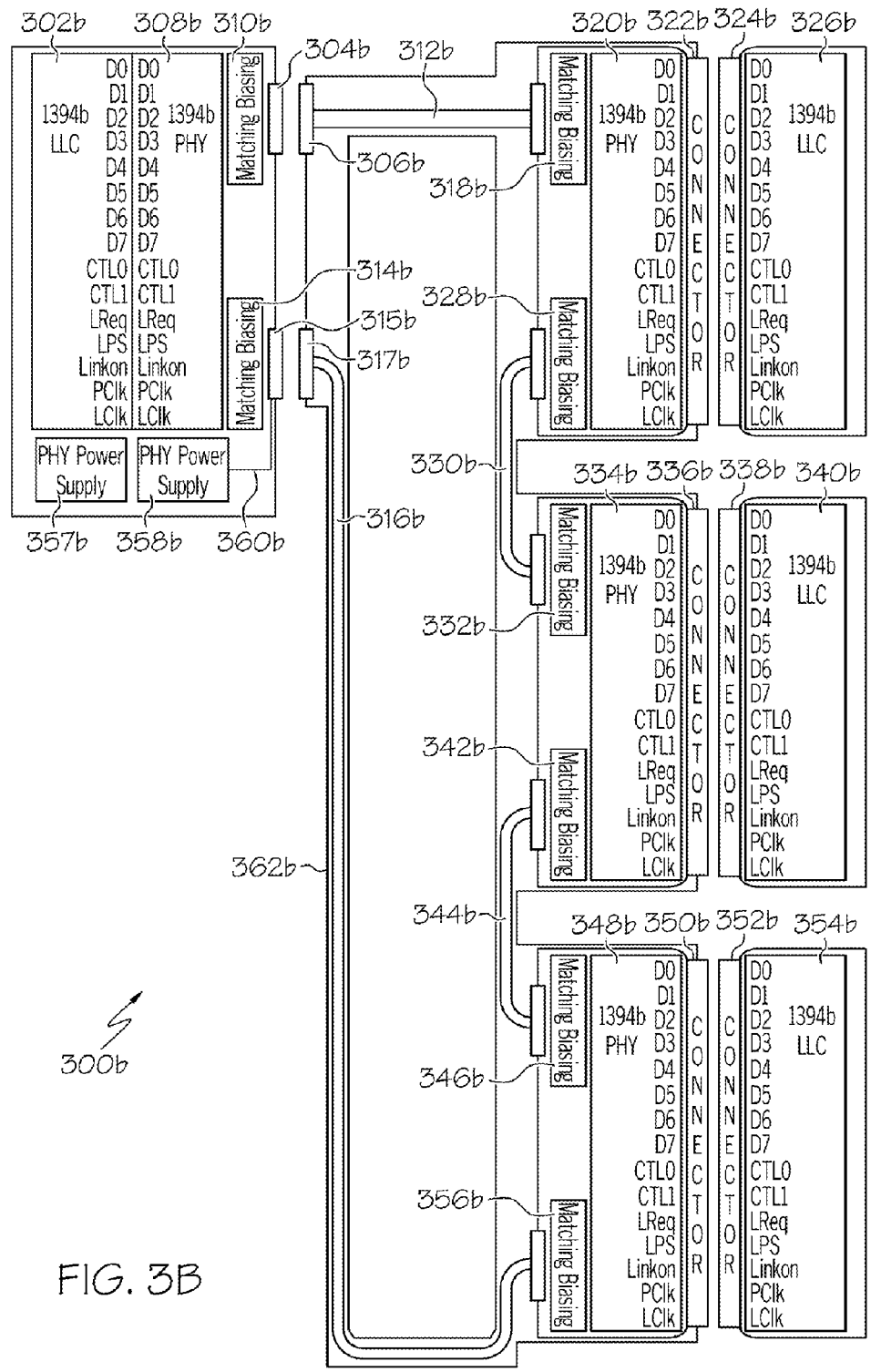

FIGS. 3A and 3B are related block diagrams depicting two active connector assemblies 300*a* and 300*b*, which can be used to implement one or more example embodiments of the present invention. For illustrative purposes in the example embodiments shown, the two connector assemblies 300*a* and 300*b* may represent similar connector assemblies that can be used, for example, in networks being operated in accordance with the IEEE 1394b protocol.

Note that, for the example embodiments depicted in FIGS. 3A and 3B, only two-node physical layer interfaces are shown. However, as discussed above with respect to FIGS. 2A and 2B, the present invention is not intended to be so limited and can include any suitable number of nodes for the physical layer interfaces involved. For example, the present invention might include physical layer segments with three matching and biasing networks and three cable connections each. If more than three nodes per physical layer segment are to be used, the last device in the chain could require only a single node. If that device were to be disconnected robustly, that function could be accomplished with a single node, robust interface.

Also note that, for the example embodiments depicted in FIGS. 3A and 3B, only four devices (one pseudo-master device and three remote devices) are shown. However, as discussed above with respect to FIGS. 2A and 2B, the present invention is not intended to be so limited and can include any suitable number of devices for the network configuration involved. For example, in accordance with the IEEE 1394 bus specifications, a maximum of 63 devices can be connected to one bus. In any event, a typical network configuration can include a substantial number of devices, and the present invention can be implemented using some or all of the devices involved.

Note further that, for the example embodiments depicted in FIGS. 3A and 3B, only one physical layer power source is shown. However, as discussed above with respect to FIGS. 2A and 2B, the present invention is not intended to be so limited and can include any suitable number of physical layer power sources for the network configuration involved. For example, depending on the number of devices on the bus involved, more than one physical layer power source may be provided. The one or more physical layer power source(s) provided can be internal to the physical layer, external to the physical layer, or one or more combinations thereof. Proper implementation can be assured by suitable routing and connection of the cabling involved.

Essentially, for the example embodiments shown in FIGS. 3A and 3B, the present invention provides respective active connector assemblies that encapsulate the IEEE 1394b physical layer segments, cable matching and biasing resistor networks, cabling and cable connectors, and the connectors that provide the physical layer to link layer interfaces. For example, the exemplary connector assemblies 300*a*, 300*b* shown can be produced using manufacturing techniques similar to those described above with respect to connector assemblies 200*a*, 200*b* shown in FIGS. 2A and 2B. In sum, for the example embodiments shown in FIGS. 3A and 3B, the present invention provides active cables, active cable assemblies and/or active connectors that can accommodate the novel technique of non-disruptively disconnecting peripheral devices in hybrid networks including robust physical layer/ link layer connections and standard connections.

Specifically, the exemplary connector assembly 300*a* shown in FIG. 3A includes a standard peripheral connection including a first link layer segment 302*a*, directly connected to a first physical layer segment 308*a*, a connector 304*a* for the standard peripheral connection, and a second connector 306*a*. The connectors 304*a* and 306*a* are matched connectors that can be plugged into one another. The first physical layer segment 308*a* includes a first matching and biasing network 310*a* and a second matching and biasing network 314*a*. As shown, for one or more example embodiments, the first link layer segment 302*a*, first physical layer segment 308*a*, and matching connectors 304*a*, 306*a* compose a standard connection for an IEEE 1394b network configuration, which cannot be used to non-disruptively disconnect a peripheral device from the IEEE 1394b network involved. Thus, as described in more detail below, connector assembly 300*a* is a hybrid connection assembly including both standard and robust peripheral connections.

For one or more example embodiments, connector assembly 300*a* also includes a second physical layer segment 320*a*, a connector 322*a* for the second physical layer segment 320*a*, a second link layer segment 326*a*, and a connector 324*a* for the second link layer segment 326*a*. The connectors 322*a*, 324*a* are matched connectors that can be plugged into one another. The second physical layer segment 320*a* includes a first matching and biasing network 318*a* and a second matching and biasing network 328*a*. An active cable segment 312*a* is connected to the matching and biasing network 310*a* of physical layer segment 308*a* on one end, and to the matching and biasing network 318*a* of physical layer segment 320*a* on the second end. As shown, for one or more example embodiments, the second physical layer segment 320*a*, second link layer segment 326*a*, and matching connectors 322*a*, 324*a* compose a robust connection for an IEEE 1394b network configuration, and the robust connection can be used to non-disruptively disconnect a peripheral device from the 1394b network involved. However, in contrast to the exemplary embodiments depicted in FIGS. 2A and 2B, the active cable segment 312a shown in FIG. 3A does not provide non-disruptive signal and power connectivity between the two physical layer segments 308a, 320a.

For one or more example embodiments, the exemplary connector assembly 300a also includes a third physical layer segment 334a, a connector 336a for the third physical layer segment 334a, a third link layer segment 340a, and a connector 338a for the third link layer segment 340a. The connectors 336a, 338a are matched connectors that can be plugged into one another. The third physical layer segment 334a includes a first matching and biasing network 332a and a second matching and biasing network 342a. An active cable segment 330a is connected to the matching and biasing network 328a of the second physical layer segment 320a on one end, and to the matching and biasing network 332a of the third physical layer segment 334a on the second end. As shown, for one or more example embodiments, the third physical layer segment 334a, third link layer segment 340a, and matching connectors 336a, 338a compose a robust connection for an IEEE 1394b network configuration, and the robust connection can be used to non-disruptively disconnect a peripheral device from the IEEE 1394b network involved. Also, in accordance with the present invention, the active cable segment 330a provides non-disruptive signal and power connectivity between the two physical layer segments 320a, 334a.

For one or more example embodiments, the exemplary connector assembly 300a also includes a fourth physical layer segment 348a, a connector 350a for the fourth physical layer segment 348a, a fourth link layer segment 354a, and a connector 352a for the fourth link layer segment 354a. The connectors 350a, 352a are matched connectors that can be plugged into one another. The fourth physical layer segment 348a includes a first matching and biasing network 346a and a second matching and biasing network 356a. An active cable segment 344a is connected to the matching and biasing network 342a of the third physical layer segment 334a on one end, and to the matching and biasing network 346a of the fourth physical layer segment 348a on the second end. As shown, for one or more example embodiments, the fourth physical layer segment 348a, fourth link layer segment 354a, and matching connectors 350a, 352a compose a robust connection for an IEEE 1394b network configuration, and the robust connection can be used to non-disruptively disconnect a peripheral device from the IEEE 1394b network involved. Also, in accordance with the present invention, the active cable segment 344a provides non-disruptive signal and power connectivity between the two physical layer segments 334a, 348a.

For one or more example embodiments, the exemplary connector assembly 300a also includes an active cable segment 316a connected to the matching and biasing network 356a of the fourth physical layer segment 348a on one end, and on the second end to a standard connector 317a that can be connected to a standard connector 315a associated with the first physical layer segment 308a of the standard peripheral connection shown. Also, the exemplary connector assembly 300a includes an external physical layer power source 358a, which is coupled to the active cable segment 316a by a power source connection 360a. Consequently, in accordance with the present invention, the active cables 312a, 330a, 344a and 316a provide signal and power source connectivity to each of the robust physical layer segments 320a, 334a and 348a in the IEEE 1394b network involved. Notably, for the one or more example embodiments that can be implemented using the connector assembly 300a, the connector assembly can be encapsulated to provide a fixed cable construction using a suitable encapsulation material such as, for example, a plastic, ceramic, or metallic material. In other embodiments, the connector assembly 300a can be formed as one unit in a flexible or semi-stiff construction. In any event, the encapsulation of the exemplary connector assembly 300a is identified generally by the label 362a.

Referring now to FIG. 3B for one or more example embodiments, the exemplary connector assembly 300b can be similar in construction and functionality as connector assembly 300a shown in FIG. 3A. As such, connector assembly 300b includes a standard connection and a plurality of robust connections. Note, however, that a primary difference between connector assembly 300a and connector assembly 300b is that connector assembly 300a provides an external power source for the physical layer segments, and connector assembly 300b provides an internal power source for the physical layer segments.

Specifically, the exemplary connector assembly 300b shown in FIG. 3B includes a standard peripheral connection including a first link layer segment 302b, directly connected to a first physical layer segment 308b, a connector 304b for the standard peripheral connection, and a second connector 306b. The connectors 304b and 306b are matched connectors that can be plugged into one another. The first physical layer segment 308b includes a first matching and biasing network 310b and a second matching and biasing network 314b. As shown, for one or more example embodiments, the first link layer segment 302b, first physical layer segment 308b, and matching connectors 304b, 306b compose a standard connection for an IEEE 1394b network configuration, which cannot be used to non-disruptively disconnect a peripheral device from the IEEE 1394b network involved. Thus, as described in more detail below, connector assembly 300b is a hybrid connection assembly including both standard and robust peripheral connections.

For one or more example embodiments, connector assembly 300b also includes a second physical layer segment 320b, a connector 322b for the second physical layer segment 320b, a second link layer segment 326b, and a connector 324b for the second link layer segment 326b. The connectors 322b, 324b are matched connectors that can be plugged into one another. The second physical layer segment 320b includes a first matching and biasing network 318b and a second matching and biasing network 328b. An active cable segment 312b is connected to the matching and biasing network 310b of physical layer segment 308b on one end, and to the matching and biasing network 318b of physical layer segment 320b on the second end. As shown, for one or more example embodiments, the second physical layer segment 320b, second link layer segment 326b, and matching connectors 322b, 324b compose a robust connection for an IEEE 1394b network configuration, and the robust connection can be used to non-disruptively disconnect a peripheral device from the 1394b network involved. However, in contrast to the exemplary embodiments depicted in FIGS. 2A and 2B, the active cable segment 312b shown in FIG. 3B does not provide non-disruptive signal and power connectivity between the two physical layer segments 308b, 320b.

For one or more example embodiments, the exemplary connector assembly 300b also includes a third physical layer segment 334b, a connector 336b for the third physical layer segment 334b, a third link layer segment 340b, and a connector 338b for the third link layer segment 340b. The connectors 336*b*, 338*b* are matched connectors that can be plugged into one another. The third physical layer segment 334*b* includes a first matching and biasing network 332*b* and a second matching and biasing network 342*b*. An active cable segment 330*b* is connected to the matching and biasing network 328*b* of the second physical layer segment 320*b* on one end, and to the matching and biasing network 332*b* of the third physical layer segment 334*b* on the second end. As shown, for one or more example embodiments, the third physical layer segment 334*b*, third link layer segment 340*b*, and matching connectors 336*b*, 338*b* compose a robust connection for an IEEE 1394b network configuration, and the robust connection can be used to non-disruptively disconnect a peripheral device from the IEEE 1394b network involved. Also, in accordance with the present invention, the active cable segment 330*b* provides non-disruptive signal and power connectivity between the two physical layer segments 320*b*, 334*b*.

For one or more example embodiments, the exemplary connector assembly 300*b* also includes a fourth physical layer segment 348*b*, a connector 350*b* for the fourth physical layer segment 348*b*, a fourth link layer segment 354*b*, and a connector 352*b* for the fourth link layer segment 354*b*. The connectors 350*b*, 352*b* are matched connectors that can be plugged into one another. The fourth physical layer segment 348*b* includes a first matching and biasing network 346*b* and a second matching and biasing network 356*b*. An active cable segment 344*ba* is connected to the matching and biasing network 342*b* of the third physical layer segment 334*b* on one end, and to the matching and biasing network 346*b* of the fourth physical layer segment 348*b* on the second end. As shown, for one or more example embodiments, the fourth physical layer segment 348*b*, fourth link layer segment 354*b*, and matching connectors 350*b*, 352*b* compose a robust connection for an IEEE 1394b network configuration, and the robust connection can be used to non-disruptively disconnect a peripheral device from the IEEE 1394b network involved. Also, in accordance with the present invention, the active cable segment 344*b* provides non-disruptive signal and power connectivity between the two physical layer segments 334*b*, 348*b*.

For one or more example embodiments, the exemplary connector assembly 300*b* also includes an active cable segment 316*b* connected to the matching and biasing network 356*b* of the fourth physical layer segment 348*b* on one end, and on the second end to a standard connector 317*b* that can be connected to a standard connector 315*b* associated with the first physical layer segment 308*b* of the standard peripheral connection shown. Also, the exemplary connector assembly 300*b* includes an internal physical layer power source 358*b*, which can be coupled to the active cable segment 316*b* by a power source connection 360*b*. Consequently, in accordance with the present invention, the active cables 312*b*, 330*b*, 344*b* and 316*b* can provide signal and power source connectivity to each of the robust physical layer segments 320*b*, 334*b* and 348*b* in the IEEE 1394b network involved. Notably, for the one or more example embodiments that can be implemented using the connector assembly 300*b*, the connector assembly can be encapsulated to provide a fixed cable construction using a suitable encapsulation material such as, for example, a plastic, ceramic, or metallic material. In other embodiments, the connector assembly 300*b* can be formed as one unit in a flexible or semi-stiff construction. In any event, the encapsulation of the exemplary connector assembly 300*b* is identified generally by the label 362*b*.

Figure 4A:
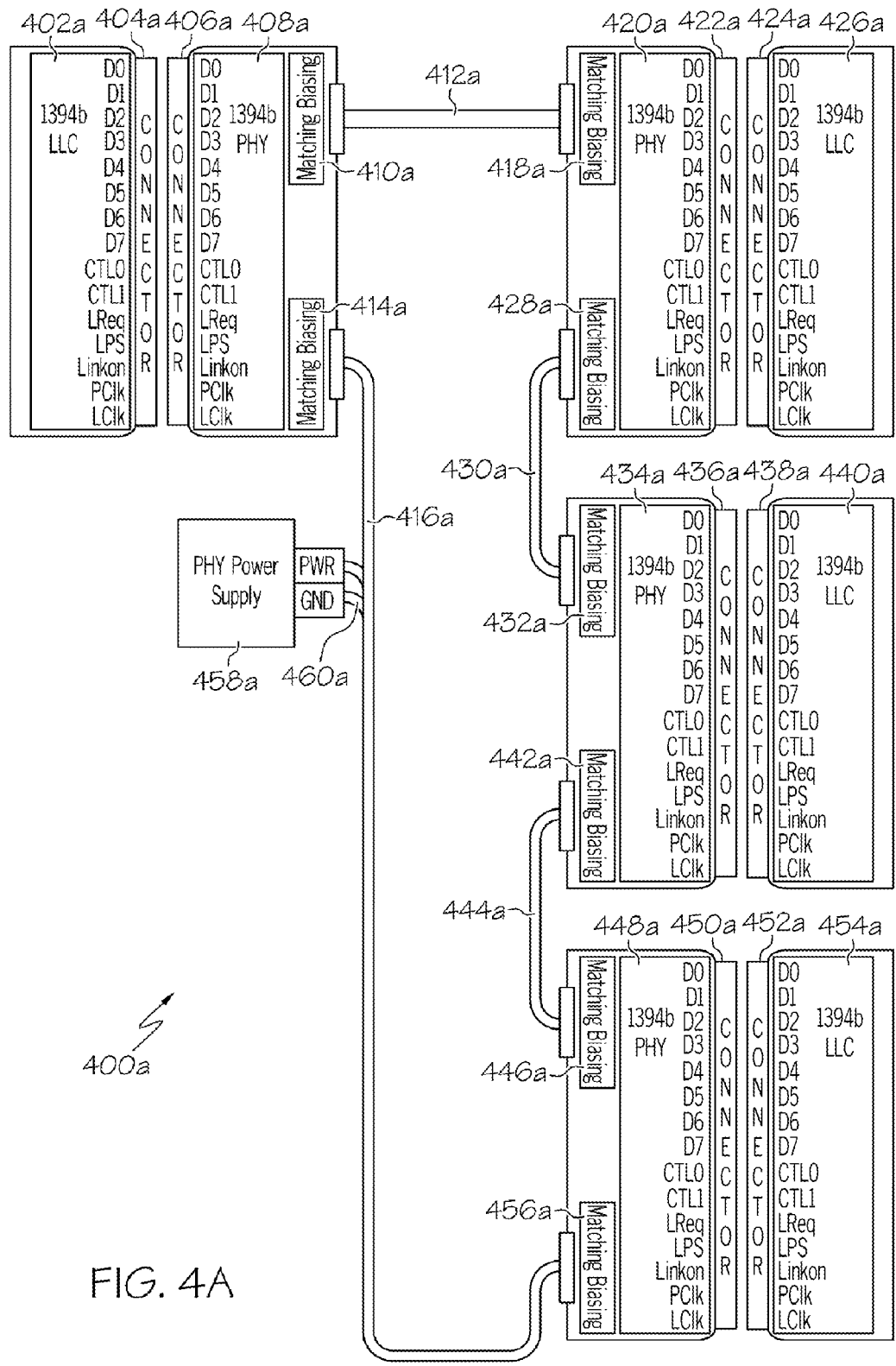
FIGS. 4A and 4B are related block diagrams depicting two active connector assemblies, which can be used to implement one or more example embodiments of the present invention.
Figure 4B:
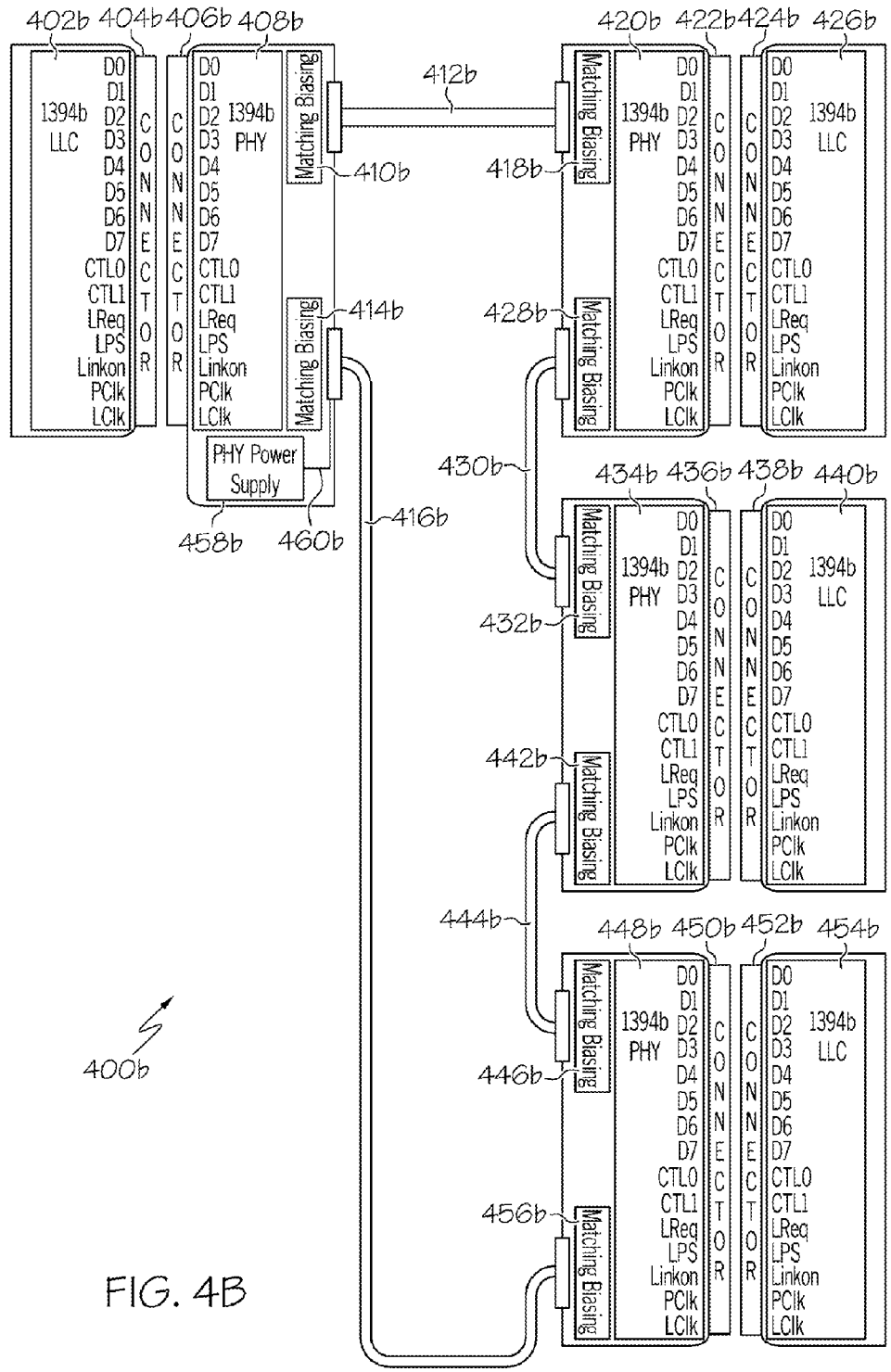

FIGS. 4A and 4B are related block diagrams depicting two active connector assemblies 400*a* and 400*b*, which can be used to implement one or more example embodiments of the present invention. For illustrative purposes in the example embodiments shown, the two connector assemblies 400*a* and 400*b* may represent similar connector assemblies that can be used, for example, in networks being operated in accordance with the IEEE 1394b protocol.

Note that, for the example embodiments depicted in FIGS. 4A and 4B, only two-node physical layer interfaces are shown. However, as discussed above with respect to FIGS. 2A and 2B, the present invention is not intended to be so limited and can include any suitable number of nodes for the physical layer interfaces involved. For example, the present invention might include physical layer segments with three matching and biasing networks and three cable connections each. If more than three nodes per physical layer segment are to be used, the last device in the chain could require only a single node. If that device were to be disconnected robustly, that function could be accomplished with a single node, robust interface.

Also note that, for the example embodiments depicted in FIGS. 4A and 4B, only four devices (one pseudo-master device and three remote devices) are shown. However, as discussed above with respect to FIGS. 2A and 2B, the present invention is not intended to be so limited and can include any suitable number of devices for the network configuration involved. For example, in accordance with the IEEE 1394 bus specifications, a maximum of 63 devices can be connected to one bus. In any event, a typical network configuration can include a substantial number of devices, and the present invention can be implemented using some or all of the devices involved.

Note further that, for the example embodiments depicted in FIGS. 4A and 4B, only one physical layer power source is shown. However, as discussed above with respect to FIGS. 2A and 2B, the present invention is not intended to be so limited and can include any suitable number of physical layer power sources for the network configuration involved. For example, depending on the number of devices on the bus involved, more than one physical layer power source may be provided. The one or more physical layer power source(s) provided can be internal to the physical layer, external to the physical layer, or one or more combinations thereof. Proper implementation can be assured by suitable routing and connection of the cabling involved.

Essentially, for the example embodiments shown in FIGS. 4A and 4B, the present invention provides respective non-encapsulated active connector assemblies that are similar in functionality to the encapsulated active connector assemblies 200*a*, 200*b* depicted in FIGS. 2A and 2B.

Specifically, the exemplary connector assembly 400*a* shown in FIG. 4A includes a first link layer segment 402*a*, a connector 404*a* for the first link layer segment 402*a*, a first physical layer segment 408*a*, and a connector 406*a* for the first physical layer segment 408*a*. The connectors 404*a*, 406*a* are matched connectors that can be plugged into one another. The first physical layer segment 408*a* includes a first matching and biasing network 410*a* and a second matching and biasing network 414*a*. As shown, for one or more example embodiments, the first link layer segment 402*a*, first physical layer segment 408*a*, and matching connectors 404*a*, 406*a* compose a robust connection for an IEEE 1394b network configuration, and the robust connection can be used to non-disruptively disconnect a peripheral device from the IEEE 1394b network involved.

For one or more example embodiments, connector assembly 400*a* also includes a second physical layer segment 420*a*, a connector 422*a* for the second physical layer segment 420*a*, a second link layer segment 426*a*, and a connector 424*a* for the second link layer segment 426a. The connectors 422a, 424a are matched connectors that can be plugged into one another. The second physical layer segment 420a includes a first matching and biasing network 418a and a second matching and biasing network 428a. An active cable segment 412a is connected to the matching and biasing network 410a of physical layer segment 408a on one end, and to the matching and biasing network 418a of physical layer segment 420a on the second end. As shown, for one or more example embodiments, the second physical layer segment 420a, second link layer segment 426a, and matching connectors 422a, 424a compose a robust connection for an IEEE 1394b network configuration, and the robust connection can be used to non-disruptively disconnect a peripheral device from the 1394b network involved. Also, in accordance with the present invention, the active cable segment 412a provides non-disruptive signal and power connectivity between the two physical layer segments 408a, 420a.

For one or more example embodiments, the exemplary connector assembly 400a also includes a third physical layer segment 434a, a connector 436a for the third physical layer segment 434a, a third link layer segment 440a, and a connector 438a for the third link layer segment 440a. The connectors 436a, 438a are matched connectors that can be plugged into one another. The third physical layer segment 434a includes a first matching and biasing network 432a and a second matching and biasing network 442a. An active cable segment 430a is connected to the matching and biasing network 428a of the second physical layer segment 420a on one end, and to the matching and biasing network 432a of the third physical layer segment 434a on the second end. As shown, for one or more example embodiments, the third physical layer segment 434a, third link layer segment 440a, and matching connectors 436a, 438a compose a robust connection for an IEEE 1394b network configuration, and the robust connection can be used to non-disruptively disconnect a peripheral device from the IEEE 1394b network involved. Also, in accordance with the present invention, the active cable segment 430a provides non-disruptive signal and power connectivity between the two physical layer segments 420a, 434a.

For one or more example embodiments, the exemplary connector assembly 400a also includes a fourth physical layer segment 448a, a connector 450a for the fourth physical layer segment 448a, a fourth link layer segment 454a, and a connector 452a for the fourth link layer segment 454a. The connectors 450a, 452a are matched connectors that can be plugged into one another. The fourth physical layer segment 448a includes a first matching and biasing network 446a and a second matching and biasing network 456a. An active cable segment 444a is connected to the matching and biasing network 442a of the third physical layer segment 434a on one end, and to the matching and biasing network 446a of the fourth physical layer segment 448a on the second end. As shown, for one or more example embodiments, the fourth physical layer segment 448a, fourth link layer segment 454a, and matching connectors 450a, 452a compose a robust connection for an IEEE 1394b network configuration, and the robust connection can be used to non-disruptively disconnect a peripheral device from the IEEE 1394b network involved. Also, in accordance with the present invention, the active cable segment 444a provides non-disruptive signal and power connectivity between the two physical layer segments 434a, 448a.

For one or more example embodiments, the exemplary connector assembly 400a also includes an active cable segment 416a connected to the matching and biasing network 456a of the fourth physical layer segment 448a on one end, and to the matching and biasing network 414a of the first physical layer segment 408a on the second end. Thus, in accordance with the present invention, the active cable segment 416a provides non-disruptive signal and power connectivity between the two physical layer segments 408a, 448a. Also, the exemplary connector assembly 400a includes an external physical layer power source 458a, which is coupled to the active cable segment 416a by a power source connection 460a. Consequently, in accordance with the present invention, the active cables 412a, 430a, 444a and 416a provide signal and power source connectivity to each of the physical layer segments 408a, 420a, 434a and 448a in the IEEE 1394b network involved.

Referring now to FIG. 4B for one or more example embodiments, the exemplary connector assembly 400b can be similar in construction and functionality as connector assembly 400a shown in FIG. 4A. Note, however, that a primary difference between connector assembly 400a and connector assembly 400b is that connector assembly 400a provides an external power source for the physical layer segments, and connector assembly 400b provides an internal power source for the physical layer segments.

Specifically, for one or more example embodiments, the connector assembly 400b shown in FIG. 4B includes a first link layer segment 402b, a connector 404b for the first link layer segment 402b, a first physical layer segment 408b, and a connector 406b for the first physical layer segment 408b. The connectors 404b, 406b are matched connectors that can be plugged into one another. The first physical layer segment 408b includes a first matching and biasing network 410b and a second matching and biasing network 414b. As shown, for one or more example embodiments, the first link layer segment 402b, first physical layer segment 408b, and matching connectors 404b, 406b compose a robust connection for an IEEE 1394b network configuration, and the robust connection can be used to non-disruptively disconnect a peripheral device from the IEEE 1394b network involved.

For one or more example embodiments, the exemplary connector assembly 400b also includes a second physical layer segment 420b, a connector 422b for the second physical layer segment 420b, a second link layer segment 426b, and a connector 424b for the second link layer segment 426b. The connectors 422b, 424b are matched connectors that can be plugged into one another. The second physical layer segment 420b includes a first matching and biasing network 418b and a second matching and biasing network 428b. An active cable segment 412b is connected to the matching and biasing network 410b of physical layer segment 408b on one end, and to the matching and biasing network 418b of physical layer segment 420b on the second end. As shown, for one or more example embodiments, the second physical layer segment 420b, second link layer segment 426b, and matching connectors 422b, 424b compose a robust connection for an IEEE 1394b network configuration, and the robust connection can be used to non-disruptively disconnect a peripheral device from the 1394b network involved. Also, in accordance with the present invention, the active cable segment 412b provides non-disruptive signal and power connectivity between the two physical layer segments 408b, 420b.

For one or more example embodiments, the exemplary connector assembly 400b also includes a third physical layer segment 434b, a connector 436b for the third physical layer segment 434b, a third link layer segment 440b, and a connector 438b for the third link layer segment 440b. The connectors 436b, 438b are matched connectors that can be plugged into one another. The third physical layer segment 434b includes a first matching and biasing network 432b and a second matching and biasing network 442b. An active cable segment 430b is connected to the matching and biasing network 428b of the second physical layer segment 420b on one end, and to the matching and biasing network 432b of the third physical layer segment 434b on the second end. As shown, for one or more example embodiments, the third physical layer segment 434b, third link layer segment 440b, and matching connectors 436b, 438b compose a robust connection for an IEEE 1394b network configuration, and the robust connection can be used to non-disruptively disconnect a peripheral device from the IEEE 1394b network involved. Also, in accordance with the present invention, the active cable segment 430b provides non-disruptive signal and power connectivity between the two physical layer segments 420b, 434b.

For one or more example embodiments, the exemplary connector assembly 400b also includes a fourth physical layer segment 448b, a connector 450b for the fourth physical layer segment 448b, a fourth link layer segment 454b, and a connector 452b for the fourth link layer segment 454b. The connectors 450b, 452b are matched connectors that can be plugged into one another. The fourth physical layer segment 448b includes a first matching and biasing network 446b and a second matching and biasing network 456b. An active cable segment 444b is connected to the matching and biasing network 442b of the third physical layer segment 434b on one end, and to the matching and biasing network 446b of the fourth physical layer segment 448b on the second end. As shown, for one or more example embodiments, the fourth physical layer segment 448b, fourth link layer segment 454b, and matching connectors 450b, 452b compose a robust connection for an IEEE 1394b network configuration, and the robust connection can be used to non-disruptively disconnect a peripheral device from the IEEE 1394b network involved. Also, in accordance with the present invention, the active cable segment 444b provides non-disruptive signal and power connectivity between the two physical layer segments 434b, 448b.

For one or more example embodiments, the exemplary connector assembly 400b also includes an active cable segment 416b connected to the matching and biasing network 456b of the fourth physical layer segment 448b on one end, and to the matching and biasing network 414b of the first physical layer segment 408b on the second end. Thus, in accordance with the present invention, the active cable segment 416b provides non-disruptive signal and power connectivity between the two physical layer segments 408b, 448b. Note that the exemplary connector assembly 400b also includes an internal physical layer power source 458b, which is coupled to the active cable segment 416b by a power source connection 460b. Consequently, in accordance with the present invention, the active cables 412b, 430b, 444b and 416b provide signal and power source connectivity to each of the physical layer segments 408b, 420b, 434b and 448b in the IEEE 1394b network involved.

Figure 5A:
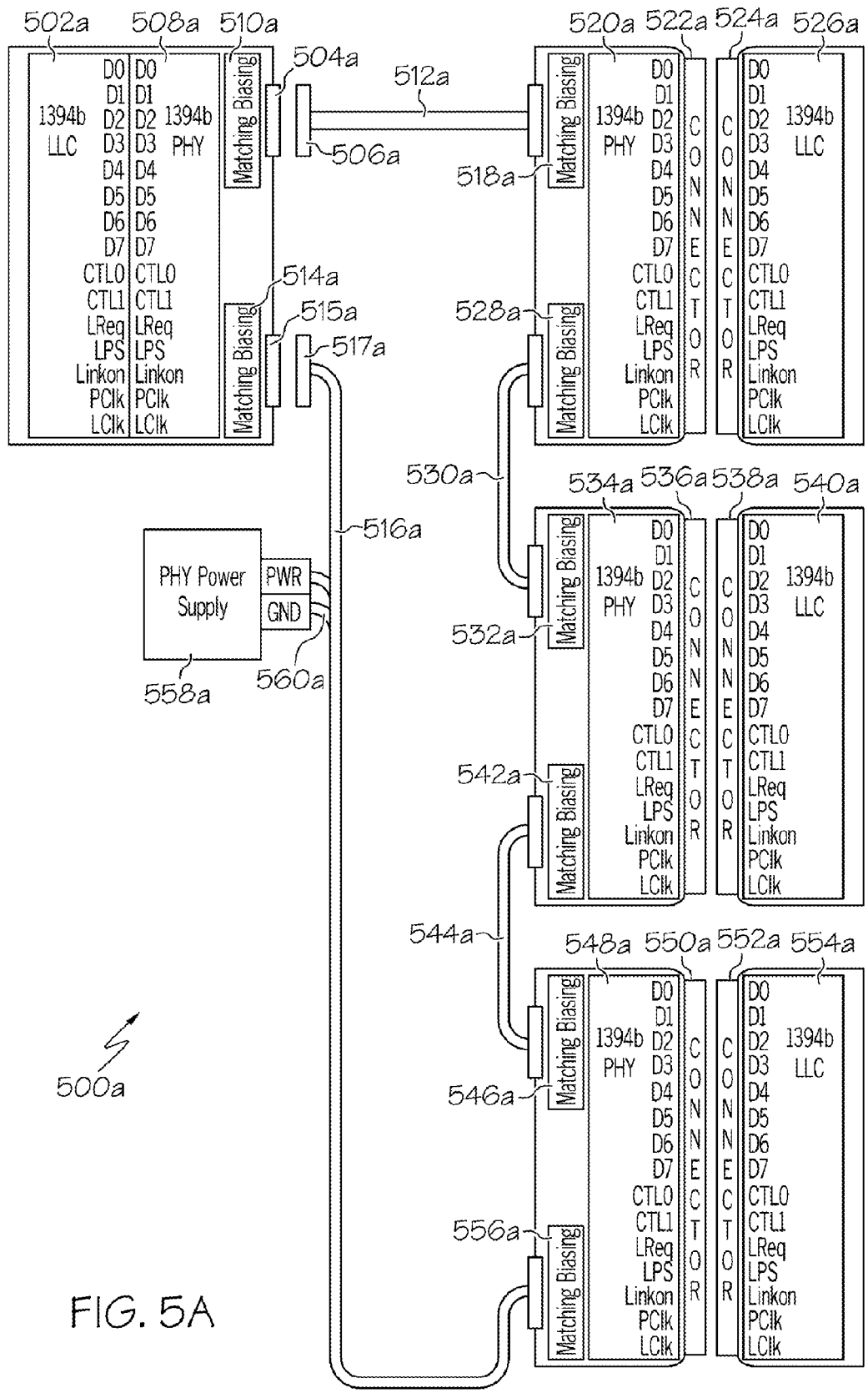
FIGS. 5A and 5B are related block diagrams depicting two active connector assemblies, which can be used to implement one or more example embodiments of the present invention.
Figure 5B:
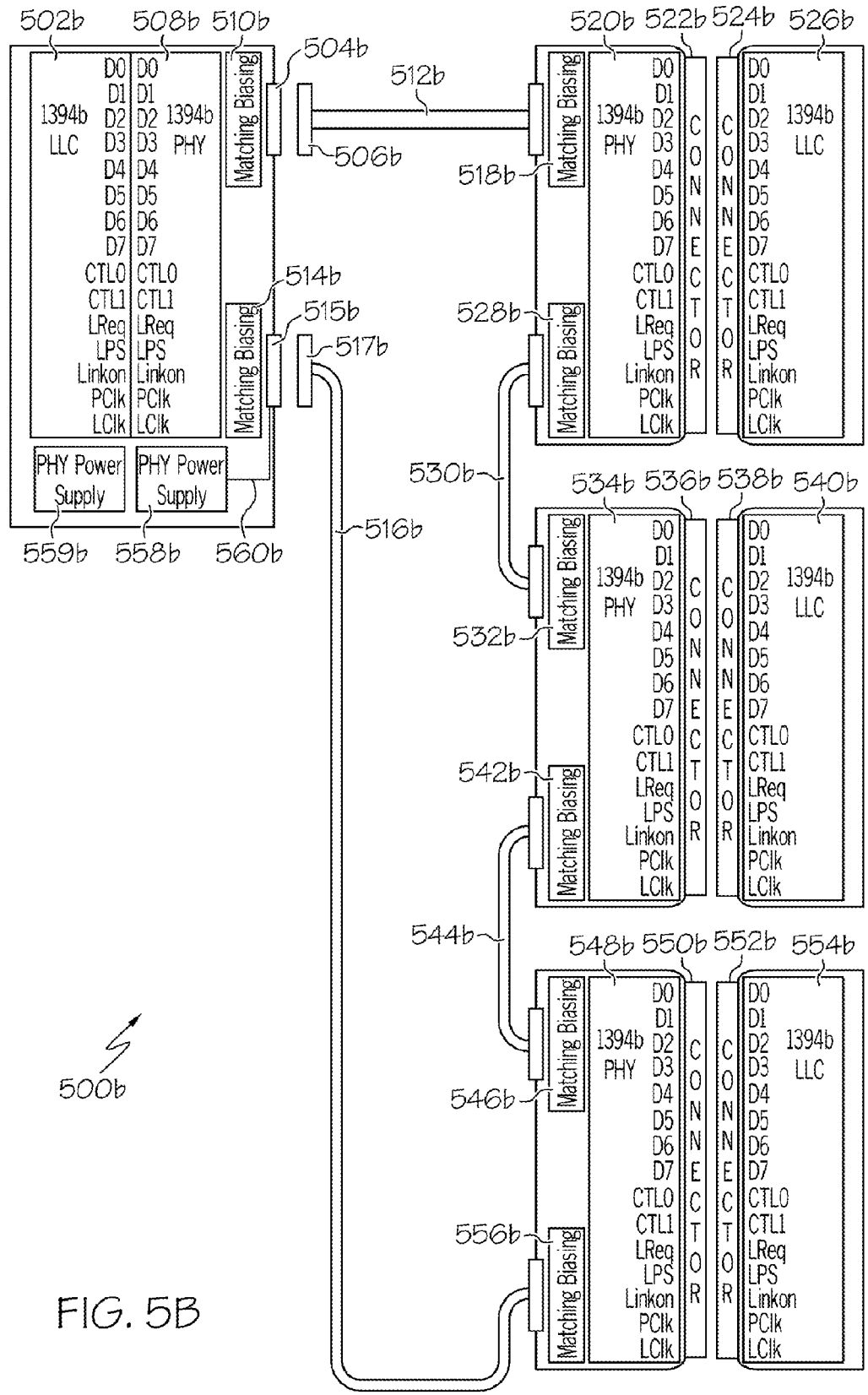

FIGS. 5A and 5B are related block diagrams depicting two active connector assemblies 500a and 500b, which can be used to implement one or more example embodiments of the present invention. For illustrative purposes in the example embodiments shown, the two connector assemblies 500a and 500b may represent similar connector assemblies that can be used, for example, in networks being operated in accordance with the IEEE 1394b protocol.

Note that, for the example embodiments depicted in FIGS. 5A and 5B, only two-node physical layer interfaces are shown. However, as discussed above with respect to FIGS. 2A and 2B, the present invention is not intended to be so limited and can include any suitable number of nodes for the physical layer interfaces involved. For example, the present invention might include physical layer segments with three matching and biasing networks and three cable connections each. If more than three nodes per physical layer segment are to be used, the last device in the chain could require only a single node. If that device were to be disconnected robustly, that function could be accomplished with a single node, robust interface.

Also note that, for the example embodiments depicted in FIGS. 5A and 5B, only four devices (one pseudo-master device and three remote devices) are shown. However, as discussed above with respect to FIGS. 2A and 2B, the present invention is not intended to be so limited and can include any suitable number of devices for the network configuration involved. For example, in accordance with the IEEE 1394 bus specifications, a maximum of 63 devices can be connected to one bus. In any event, a typical network configuration can include a substantial number of devices, and the present invention can be implemented using some or all of the devices involved.

Note further that, for the example embodiments depicted in FIGS. 5A and 5B, only one physical layer power source is shown. However, as discussed above with respect to FIGS. 2A and 2B, the present invention is not intended to be so limited and can include any suitable number of physical layer power sources for the network configuration involved. For example, depending on the number of devices on the bus involved, more than one physical layer power source may be provided. The one or more physical layer power source(s) provided can be internal to the physical layer, external to the physical layer, or one or more combinations thereof. Proper implementation can be assured by suitable routing and connection of the cabling involved.

Essentially, for the example embodiments shown in FIGS. 5A and 5B, the present invention provides respective non-encapsulated active connector assemblies that are similar in functionality to the encapsulated active connector assemblies 300a, 300b depicted in FIGS. 3A and 3B. As such, for the example embodiments shown in FIGS. 5A and 5B, the present invention provides active cables, active cable assemblies and/or active connectors that can accommodate the novel technique of non-disruptively disconnecting peripheral devices in hybrid networks including robust physical layer/link layer connections and standard connections.

Specifically, the exemplary connector assembly 500a shown in FIG. 5A includes a standard peripheral connection including a first link layer segment 502a, directly connected to a first physical layer segment 508a, a connector 504a for the standard peripheral connection, and a second connector 506a. The connectors 504a and 506a are matched connectors that can be plugged into one another. The first physical layer segment 508a includes a first matching and biasing network 510a and a second matching and biasing network 514a. As shown, for one or more example embodiments, the first link layer segment 502a, first physical layer segment 508a, and matching connectors 504a, 506a compose a standard connection for an IEEE 1394b network configuration, which cannot be used to non-disruptively disconnect a peripheral device from the IEEE 1394b network involved. Thus, as described in more detail below, connector assembly 500a is a hybrid connection assembly including both standard and robust peripheral connections.

For one or more example embodiments, connector assembly 500a also includes a second physical layer segment 520a, a connector 522a for the second physical layer segment 520a, a second link layer segment 526a, and a connector 524a for the second link layer segment 526a. The connectors 522a, 524a are matched connectors that can be plugged into one another. The second physical layer segment 520a includes a first matching and biasing network 518a and a second matching and biasing network 528a. An active cable segment 512a is connected to the matching and biasing network 510a of physical layer segment 508a on one end, and to the matching and biasing network 518a of physical layer segment 520a on the second end. As shown, for one or more example embodiments, the second physical layer segment 520a, second link layer segment 526a, and matching connectors 522a, 524a compose a robust connection for an IEEE 1394b network configuration, and the robust connection can be used to non-disruptively disconnect a peripheral device from the 1394b network involved. However, in contrast to the exemplary embodiments depicted in FIGS. 3A and 3B, the active cable segment 512a shown in FIG. 5A does not provide non-disruptive signal and power connectivity between the two physical layer segments 508a, 520a.

For one or more example embodiments, the exemplary connector assembly 500a also includes a third physical layer segment 534a, a connector 536a for the third physical layer segment 534a, a third link layer segment 540a, and a connector 538a for the third link layer segment 540a. The connectors 536a, 538a are matched connectors that can be plugged into one another. The third physical layer segment 534a includes a first matching and biasing network 532a and a second matching and biasing network 542a. An active cable segment 530a is connected to the matching and biasing network 528a of the second physical layer segment 520a on one end, and to the matching and biasing network 532a of the third physical layer segment 534a on the second end. As shown, for one or more example embodiments, the third physical layer segment 534a, third link layer segment 540a, and matching connectors 536a, 538a compose a robust connection for an IEEE 1394b network configuration, and the robust connection can be used to non-disruptively disconnect a peripheral device from the IEEE 1394b network involved. Also, in accordance with the present invention, the active cable segment 530a provides non-disruptive signal and power connectivity between the two physical layer segments 520a, 534a.

For one or more example embodiments, the exemplary connector assembly 500a also includes a fourth physical layer segment 548a, a connector 550a for the fourth physical layer segment 548a, a fourth link layer segment 554a, and a connector 552a for the fourth link layer segment 554a. The connectors 550a, 552a are matched connectors that can be plugged into one another. The fourth physical layer segment 548a includes a first matching and biasing network 546a and a second matching and biasing network 556a. An active cable segment 544a is connected to the matching and biasing network 542a of the third physical layer segment 534a on one end, and to the matching and biasing network 546a of the fourth physical layer segment 548a on the second end. As shown, for one or more example embodiments, the fourth physical layer segment 548a, fourth link layer segment 554a, and matching connectors 550a, 552a compose a robust connection for an IEEE 1394b network configuration, and the robust connection can be used to non-disruptively disconnect a peripheral device from the IEEE 1394b network involved. Also, in accordance with the present invention, the active cable segment 544a provides non-disruptive signal and power connectivity between the two physical layer segments 534a, 548a.

For one or more example embodiments, the exemplary connector assembly 500a also includes an active cable segment 516a connected to the matching and biasing network 556a of the fourth physical layer segment 548a on one end, and on the second end to a standard connector 517a that can be connected to a standard connector 515a associated with the first physical layer segment 508a of the standard peripheral connection shown. Also, the exemplary connector assembly 500a includes an external physical layer power source 558a, which can be coupled to the active cable segment 516a by a power source connection 560a. Consequently, in accordance with the present invention, the active cables 512a, 530a, 544a and 516a can provide signal and power source connectivity to each of the robust physical layer segments 520a, 534a and 548a in the IEEE 1394b network involved.

Referring now to FIG. 5B for one or more example embodiments, the exemplary connector assembly 500b can be similar in construction and functionality as connector assembly 500a shown in FIG. 5A. As such, connector assembly 500b includes a standard connection and a plurality of robust connections. Note, however, that a primary difference between connector assembly 500a and connector assembly 500b is that connector assembly 500a provides an external power source for the physical layer segments, and connector assembly 500b provides an internal power source for the physical layer segments.

Specifically, the exemplary connector assembly 500b shown in FIG. 5B includes a standard peripheral connection including a first link layer segment 502b, directly connected to a first physical layer segment 508b, a connector 504b for the standard peripheral connection, and a second connector 506b. The connectors 504b and 506b are matched connectors that can be plugged into one another. The first physical layer segment 508b includes a first matching and biasing network 510b and a second matching and biasing network 514b. As shown, for one or more example embodiments, the first link layer segment 502b, first physical layer segment 508b, and matching connectors 504b, 506b compose a standard connection for an IEEE 1394b network configuration, which cannot be used to non-disruptively disconnect a peripheral device from the IEEE 1394b network involved. Thus, as described in more detail below, connector assembly 500b is a hybrid connection assembly including both standard and robust peripheral connections.

For one or more example embodiments, connector assembly 500b also includes a second physical layer segment 520b, a connector 522b for the second physical layer segment 520b, a second link layer segment 526b, and a connector 524b for the second link layer segment 526b. The connectors 522b, 524b are matched connectors that can be plugged into one another. The second physical layer segment 520b includes a first matching and biasing network 518b and a second matching and biasing network 528b. An active cable segment 512b is connected to the matching and biasing network 510b of physical layer segment 508b on one end, and to the matching and biasing network 518b of physical layer segment 520b on the second end. As shown, for one or more example embodiments, the second physical layer segment 520b, second link layer segment 526b, and matching connectors 522b, 524b compose a robust connection for an IEEE 1394b network configuration, and the robust connection can be used to non-disruptively disconnect a peripheral device from the 1394b network involved. However, in contrast to the exemplary embodiments depicted in FIGS. 4A and 4B, the active cable segment 512b shown in FIG. 5B does not provide non-disruptive signal and power connectivity between the two physical layer segments 508b, 520b.

For one or more example embodiments, the exemplary connector assembly 500b also includes a third physical layer segment 534b, a connector 536b for the third physical layer segment 534b, a third link layer segment 540b, and a connector 538b for the third link layer segment 540b. The connectors 536b, 538b are matched connectors that can be plugged into one another. The third physical layer segment 534b includes a first matching and biasing network 532b and a second matching and biasing network 542b. An active cable segment 530b is connected to the matching and biasing network 528b of the second physical layer segment 520b on one end, and to the matching and biasing network 532b of the third physical layer segment 534b on the second end. As shown, for one or more example embodiments, the third physical layer segment 534b, third link layer segment 540b, and matching connectors 536b, 538b compose a robust connection for an IEEE 1394b network configuration, and the robust connection can be used to non-disruptively disconnect a peripheral device from the IEEE 1394b network involved. Also, in accordance with the present invention, the active cable segment 530b provides non-disruptive signal and power connectivity between the two physical layer segments 520b, 534b.

For one or more example embodiments, the exemplary connector assembly 500b also includes a fourth physical layer segment 548b, a connector 550b for the fourth physical layer segment 548b, a fourth link layer segment 554b, and a connector 552b for the fourth link layer segment 554b. The connectors 550b, 552b are matched connectors that can be plugged into one another. The fourth physical layer segment 548b includes a first matching and biasing network 546b and a second matching and biasing network 556b. An active cable segment 544ba is connected to the matching and biasing network 542b of the third physical layer segment 534b on one end, and to the matching and biasing network 546b of the fourth physical layer segment 548b on the second end. As shown, for one or more example embodiments, the fourth physical layer segment 548b, fourth link layer segment 554b, and matching connectors 550b, 552b compose a robust connection for an IEEE 1394b network configuration, and the robust connection can be used to non-disruptively disconnect a peripheral device from the IEEE 1394b network involved. Also, in accordance with the present invention, the active cable segment 544b provides non-disruptive signal and power connectivity between the two physical layer segments 534b, 548b.

For one or more example embodiments, the exemplary connector assembly 500b also includes an active cable segment 516b connected to the matching and biasing network 556b of the fourth physical layer segment 548b on one end, and on the second end to a standard connector 517b that can be connected to a standard connector 515b associated with the first physical layer segment 508b of the standard peripheral connection shown. Also, the exemplary connector assembly 500b includes an internal physical layer power source 358b, which can be coupled to the active cable segment 516b by a power source connection 560b. Consequently, in accordance with the present invention, the active cables 512b, 530b, 544b and 516b can provide signal and power source connectivity to each of the robust physical layer segments 520b, 534b and 548b in the IEEE 1394b network involved.

It is important to note that while the present invention has been described in the context of a fully functioning apparatus and method for connectivity, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular apparatus and/or method for connectivity.

The reconfiguration process occurring when a peripheral device is disconnected from a communication bus generally works well for personal computers, but it can produce catastrophic side-effects in other situations. Most of these undesirable effects occur because during the reconfiguration process, no activity other than reconfiguration is allowed on the communication bus. Thus, regular communication to and between the peripherals is completely disabled. When the communication bus sends information to thrusters and rudders on a spacecraft, for example, the communication silence during reconfiguration of the bus can block or delay essential communications necessary to keep the system on course. In a spacecraft, a disruption for even a millisecond can place the mission in jeopardy. Additionally, if an error occurs during the reconfiguration, the communication bus may not work at all and may cause the entire system to fail. Thus, in some situations reconfiguration of the chain of peripherals is not even possible.

In many systems, e.g. spacecraft, a new connection to the peripheral chain will never occur after initial set-up. In these systems only disconnects will occur. Furthermore, many communication protocols have the built in capability of notifying a physical layer that a peripheral connected to the communication bus will be put into a sleep mode. In this situation, all layers of the peripheral device are disabled except for the physical layer. The physical layer remains active to awaken the peripheral when the peripheral comes out of sleep. Typically, this is used when a peripheral device is put into sleep mode to save power on the host device.

The present method and apparatus allows a peripheral to disconnect from a communication bus without causing disruption to other peripherals on the bus. The present apparatus does this by physically disconnecting from the communication bus without causing a reconfiguration of the communication bus. This is accomplished by placing the physical connector for the peripheral between the physical layer and the link layer of the interface protocol. Before the peripheral is disconnected the link layer is disabled. The physical layer, however, remains enabled during and after disconnection of the peripheral. The physical layer can remain enabled, because the location of the connector between the physical layer and the link layer allows the peripheral to be removed without removing the physical layer. Thus, the physical layer can remain in full communication with the communication bus during and after the peripheral device is disconnected. No reconfiguration of the bus is needed after disconnection of the peripheral, because the communication bus can still communicate with all the same physical layers as before disconnection of the peripheral. From the perspective of the communication bus, the peripheral set up has not changed. Additionally, the design does not alter regular interface functions at all.

Figure 6:
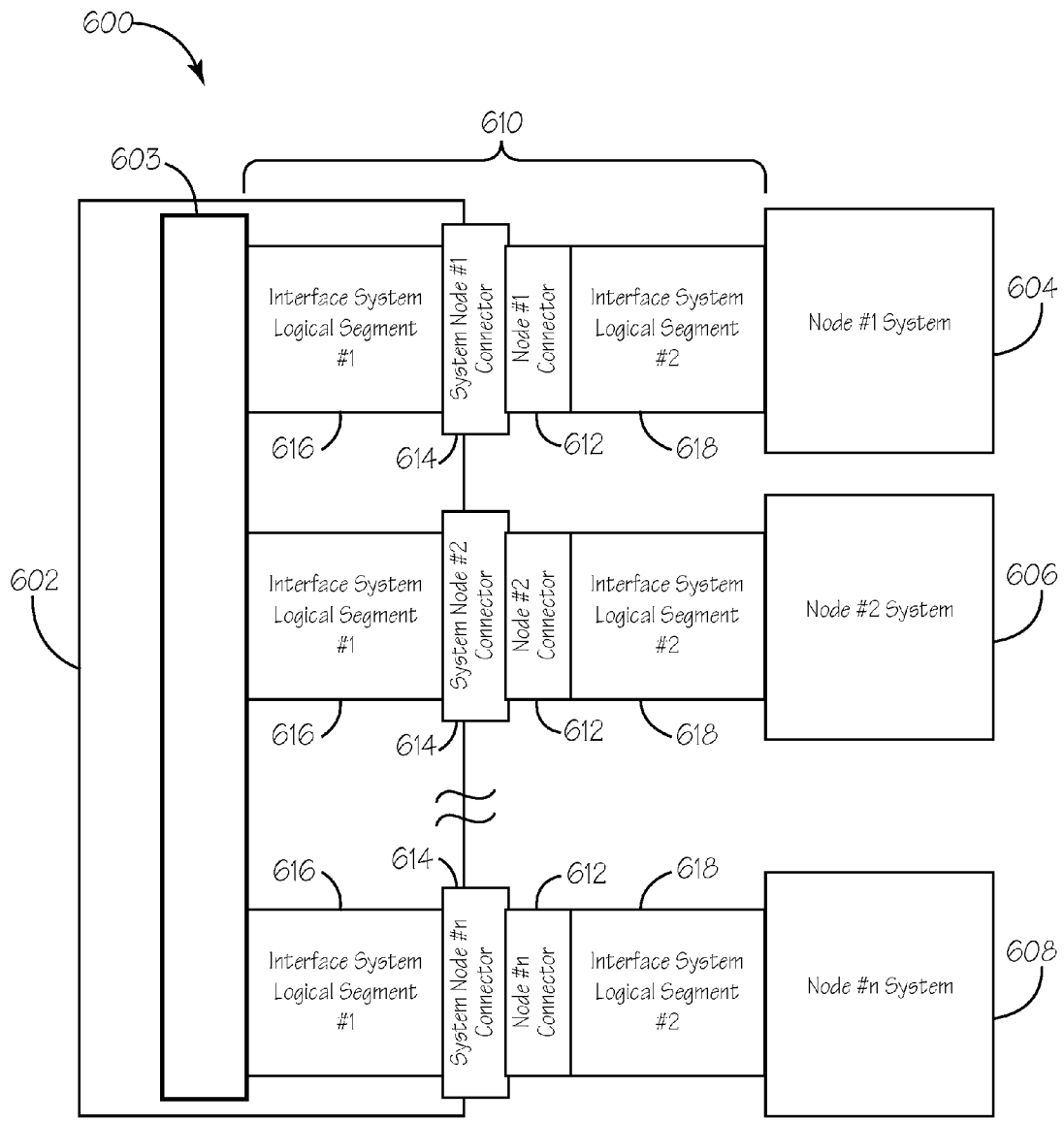
FIG. 6 is a schematic view of one embodiment of a system for non-disruptively disconnecting peripheral devices.

FIG. 6 illustrates one embodiment, of a multi-peripheral system 600 for disconnecting a peripheral without causing reconfiguration of a communication bus. The central component of system 600 is host device 602. Host 602 has a communication bus 603 with a plurality of peripherals 604, 606, 608 connected thereto. In one embodiment, peripherals 604, 606, 608 are daisy-chained together with peripheral 604 at the beginning of the chain. Thus, communications to and from peripheral 608 must be relayed through peripheral 604 and peripheral 606 to and from host 602. In another embodiment, peripherals 604, 606, 608 are connected as a multi-drop system whereby each peripheral 604, 606, 608 has a direct communication path to host 602. Alternatively, peripherals 604, 606, 608 could be connected by switched hubs or any other method of connecting peripherals to a host system. Host 602 is Plug-and-Play enabled, therefore, peripherals 604, 606, 608 can be connected and disconnected at any time from host 602.

Peripherals 604, 606, 608 communicate with each other and host 602 over communications bus 603. In one embodiment, each peripheral 604, 606, 608 connects and disconnects with communication bus 603 using the same connectors and the same interfaces. The connectors and interfaces will, therefore, be explained in reference only to peripheral 606. In system 600, peripheral 606 communicates over communication bus 603 through a peripheral interface 610. Peripheral 606 can be connected and disconnected by plugging and unplugging a peripheral connector 612 to and from a host connector 614. In one embodiment, peripheral connector 612 is a male connector which is connectable to a female host connector 614.

The peripheral interface 610 allows peripheral 606 to communicate over communication bus 603. Interface 610 transforms commands/data from peripheral 606 into bits and transmits the bits over communication bus 603. In addition, interface 610 receives bits from communication bus 603 and transforms the bits back into commands/data before providing the commands/data to peripheral 606.

Figure 7:
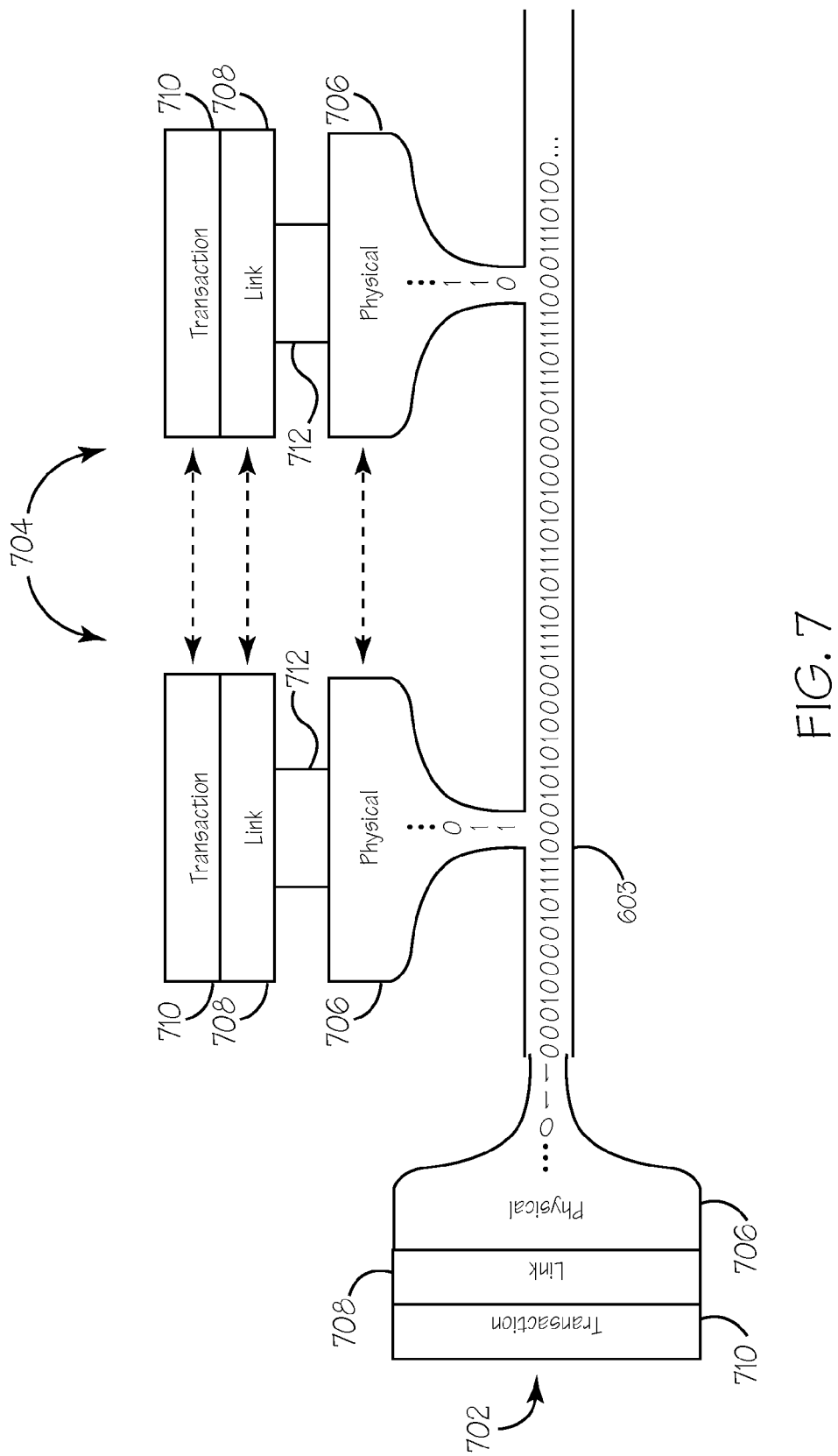
FIG. 7 is a schematic view of one embodiment of a communication bus and interface protocol for non-disruptively disconnecting peripheral devices.

FIG. 7 illustrates one embodiment of a communication bus 603 with a host interface 702 and two peripheral interfaces 704. Host interface 702 allows a processor (not shown) on a host device to transmit and receive over communication bus 603. Likewise, peripheral interface 704 allows a peripheral device to transmit and receive over communication bus 603. Host interface 702 and peripheral interfaces 704 are made up of three adjacent logical layers, a physical layer 706, a link layer 708, and an application layer 710. In one embodiment, peripheral interfaces have connectors 712 that allow a peripheral device to be disconnected from communication bus 603.

Logical layers 706, 708, 710 interact with one another to translate information between communication bus 603 and an associated peripheral or host device. For a peripheral or host device to receive data, bits from communications bus 603 are received and error checked by physical layer 706. Physical layer 706 then provides the bits to link layer 708. Link layer 708 forms the bits into packets and provides the packets to transaction layer 710. Transaction layer 710 forms the packets into commands/data, and provides the commands/data to the peripheral or host device for processing or storage. Commands/data being sent on communication bus 603, travels in the opposite direction through logical layers 706, 708, 710. First a peripheral or host device provides transaction layer 710 with the commands/data. Transaction layer 710 interprets the commands/data and provides it to link layer 708. Link layer 708 divides the information up into packets and provides the packets to physical layer 706. Physical layer 706 negotiates for space on communication bus 603 and sends the packets as a bit level transmission on communication bus 603. Alternatively, host interface 702 and peripheral interfaces 704 may have as many layers as desired, as long as peripheral interfaces 704 can form a junction for a connector as explained below. In one embodiment, communication bus 603 is an IEEE 1394 compliant bus, also known as FireWire. Alternatively, communication bus 603 could be a USB, a PCI bus, or other bus used to connect peripherals to a host system.

Referring back to FIG. 6, connectors 612, 614 are located at the junction of two logical layers 616, 618 of peripheral interface 610. Connectors 612, 614 can be placed at any existing physical or logical junction of peripheral interface 610, as long as peripheral interface 610 is separated into distinct layers. Alternatively, a distinct junction can be created in peripheral interface 610. The placement of connectors 612, 614, however, should allow full communication with other peripherals 604, 608 and host 602 after peripheral 606 is disconnected. In this embodiment, logical layer 616 is a physical layer and logical layer 618 is a link layer of the IEEE 1394 protocol. The effect of the placement of connectors 612, 614 is to remove logical layer 616 layer of peripheral interface 610 from peripheral 606 and incorporate logical layer 616 into host 602. Alternatively, if connectors 612, 614 were placed at the junction of higher logical layers, additional logical layers would be incorporated into host 602.

Figure 8:
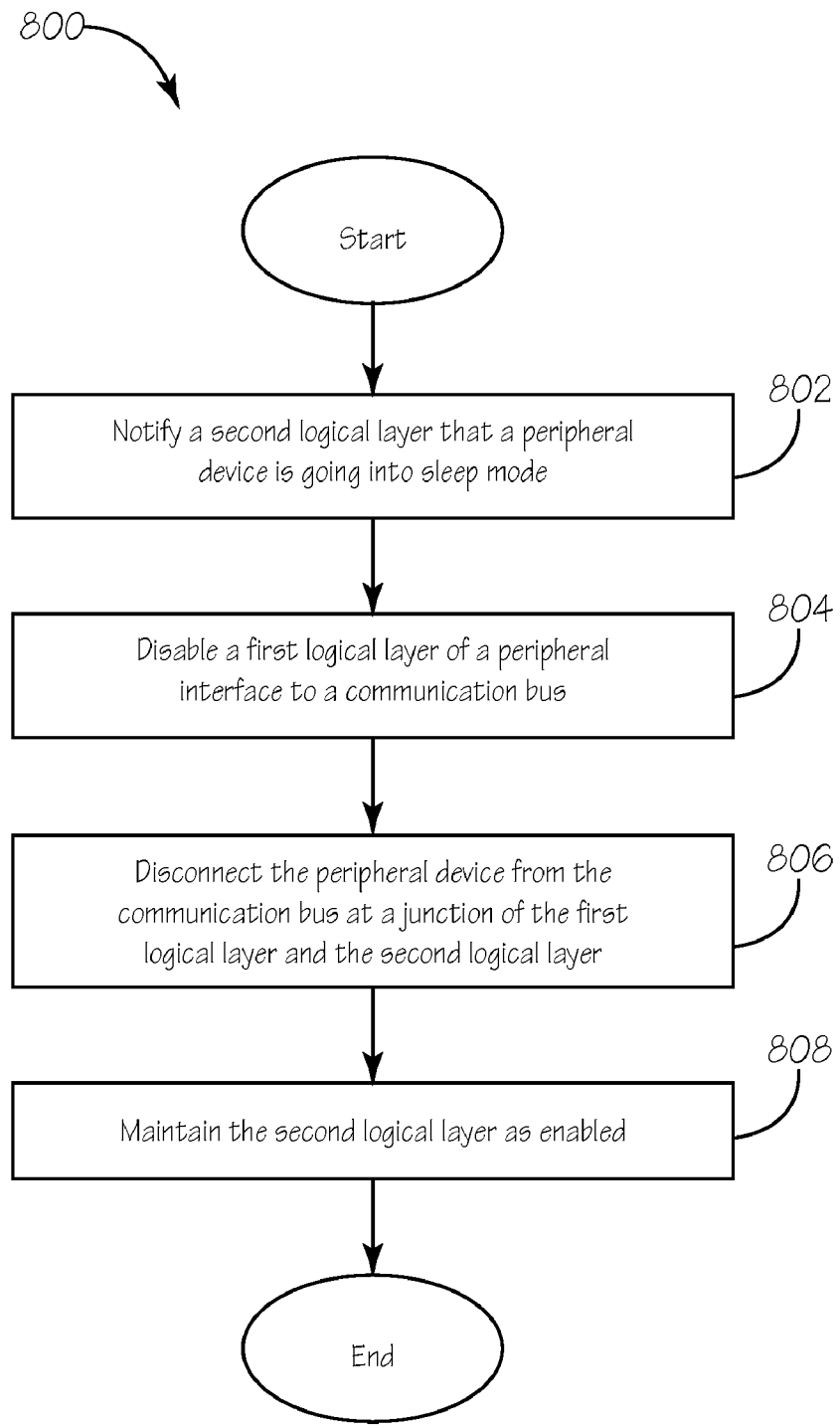
FIG. 8 is a flow diagram illustrating one embodiment of a method of non-disruptively disconnecting a peripheral device.

FIG. 8 illustrates one embodiment of a method 800 of non-disruptively disconnecting a peripheral. First logical layers 616, 618 of peripheral interface 610 are notified that peripheral 606 will be disconnected. In one embodiment, logical layer 618 has a sleep mode function and logical layer 616 is notified that logical layer 618 is going into sleep mode (802). Logical layer 618 is then disabled (804). Peripheral 606 can now be physically disconnected from communication bus 603 (806). In one embodiment, peripheral 606 is a rocket booster and host 602 is a spacecraft. The rocket booster is physically disconnected from the spacecraft by unlatching a hitch and floating away the spacecraft. In the process of breaking away, rocket booster unplugs physical electrical connector 612 from another physical electrical connector 614 on the spacecraft. Throughout the process of disconnecting peripheral 606, and even after peripheral 606 and logical layer 618 have been disconnected from host 602, logical layer 616 remains enabled and in full communication with communication bus 603 (808). Logical layer 616, however, no longer attempts to communicate with logical layer 618. Logical layer 616 is still in full communication with communication bus 603, so no reconfiguration request is sent to host 602. Additionally, communication bus 603 is not tied up with a reconfiguration process, therefore, host 602 and peripherals 604, 608 can communicate at all times during and after the disconnect of peripheral 604.

Figure 9:
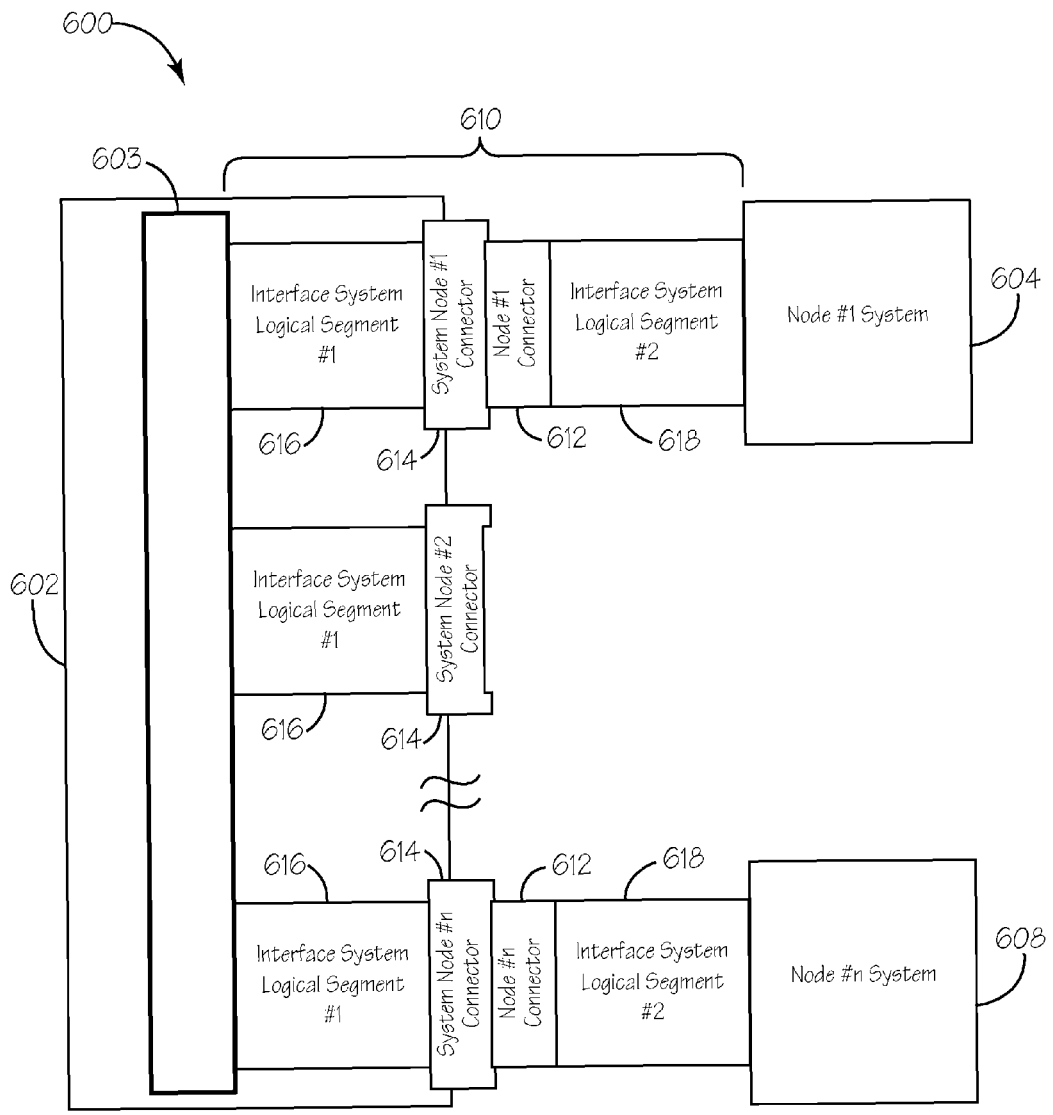
FIG. 9 is a schematic view of the embodiment of a system for non-disruptively disconnecting peripheral devices shown in FIG. 6.

FIG. 9 illustrates system 600 after peripheral 606 has been removed. Here, logical layer 616 of peripheral interface 610 is maintained in full communication with communication bus 603. Thus, communication bus 603 does not need to reconfigure, because the configuration of peripherals 604, 606, 608 has not changed. Additionally, if communication bus 603 is set up in a daisy-chain format, host 602 can still communicate with peripheral 608 because logical layer 616 is enabled and can forward data to and from peripheral 608. In another embodiment, if logical layer 616 attempts to initiate a reconfiguration request of communication bus 603, communication bus 603 will ignore the reconfiguration request. In yet another embodiment, a mechanism to block the reconfiguration request, such as a software interrupt, is implemented.

In another embodiment, logical layer 616 is not notified that peripheral 606 will be going to sleep prior to disconnecting peripheral 606. In this embodiment, host connector 614 has a sensor that detects the presence (or absence) of peripheral 606. When peripheral connector 618 is separated from host connector 616, host connector 614 sends a signal to logical layer 616 that peripheral 606 is in sleep mode. Logical layer 616 then no longer attempts to communicate with peripheral 606.

In one embodiment, peripheral 606 can also be re-connected without causing reconfiguration of communication bus 603. Since communication bus 603 did not go through reconfiguration when peripheral 606 was disconnected, communication bus 603 is still configured for peripheral 606 to be connected to host connector 614. Thus, no reconfiguration of communication bus 603 is needed to re-connect peripheral 606 to host 602 at host connector 614. Once peripheral connector 612 is connected to host connector 614, logical layer 616 of peripheral interface is enabled and peripheral 606 can communicate over communication bus 603. In one embodiment, although peripheral 606 can be re-connected without causing a disruption of communication bus 603, no other peripherals can be re-connected to host connector 614. Since communication bus 603 is still configured for peripheral 606, any other device if connected to host connector 614 will not be configured on communication bus 603. These other devices would require reconfiguration of communication bus 603 in order to work properly with host 602.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. An electronic device comprising: a communication bus having a physical layer for interacting with a peripheral device, the physical layer configured to be adjacent to a link layer on the peripheral device; a connector at a junction of the physical layer and the link layer; wherein communication through the communication bus is maintained through the physical layer when the link layer of the peripheral device is disconnected from the physical layer at the connector; and
   wherein the link layer of the peripheral device is configured to be disabled before disconnection from the physical layer at the connector.

2. The device of claim 1, wherein the communication bus further comprises a host interface.

3. The device of claim 1, wherein the communication bus is configured to have a plurality of devices connected in a multi-drop arrangement.

4. The device of claim 1, wherein the communication bus is configured to have a plurality of devices connected in a daisy-chain arrangement.

5. The device of claim 1, wherein the communication bus is a plug-and-play communication bus.

6. The device of claim 1, wherein the communication bus conforms to an IEEE 1394 protocol.

7. A peripheral device comprising: a physical layer for a peripheral device, the physical layer interacting with a communication bus, the physical layer adjacent to a link layer of the peripheral device, between the link layer and the communication bus;
   a connector at a junction of the physical layer and the link layer, and
   wherein the link layer of the peripheral device is configured to be disabled before disconnection from the physical layer at the connector.

8. The device of claim 7, wherein the communication bus is configured to have a plurality of devices connected in a daisy-chain arrangement.

9. The device of claim 7, wherein the communication bus is a plug-and-play communication bus.

10. The device of claim 7, wherein communication through the communication bus is maintained through the physical layer when the link layer of the peripheral device is disconnected from the physical layer at the connector.

* * * * *